US011273622B2

(12) United States Patent
Stickler

(10) Patent No.: US 11,273,622 B2
(45) Date of Patent: Mar. 15, 2022

(54) STIFFENING ELEMENTS THAT COMPRISE INTEGRAL CURRENT FLOWPATHS

(71) Applicant: The Boeing Company, Chicago, IL (US)

(72) Inventor: Patrick B. Stickler, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 86 days.

(21) Appl. No.: 15/708,894

(22) Filed: Sep. 19, 2017

(65) Prior Publication Data
US 2018/0162103 A1 Jun. 14, 2018

Related U.S. Application Data

(63) Continuation-in-part of application No. 15/378,931, filed on Dec. 14, 2016, now Pat. No. 11,077,644, and
(Continued)

(51) Int. Cl.
*B32B 15/14* (2006.01)
*B32B 15/04* (2006.01)
(Continued)

(52) U.S. Cl.
CPC .............. *B32B 15/14* (2013.01); *B32B 5/26* (2013.01); *B32B 15/04* (2013.01); *B32B 15/043* (2013.01);
(Continued)

(58) Field of Classification Search
CPC .......... B32B 15/14; B32B 15/04; B32B 5/26; B32B 37/14; B32B 15/20; B32B 15/043;
(Continued)

(56) References Cited

U.S. PATENT DOCUMENTS 3,341,052 A    9/1967  Barthel
3,691,000 A *  9/1972  Kalnin ................. B29C 70/04
                                                    428/114
(Continued)

FOREIGN PATENT DOCUMENTS

CN         103338925 A     10/2013
WO    WO-2004071761 A1 *   8/2004  .............. B32B 5/02
(Continued)

OTHER PUBLICATIONS

Author Unknown, "Typical Mechanical Properties of Wrought Aluminum Alloys at Various Temperatures", ASM International, The Materials Information Society, 1997, 10 pages.
(Continued)

*Primary Examiner* — Jennifer A Steele
(74) *Attorney, Agent, or Firm* — MH2 Technology Law Group LLP

(57) ABSTRACT

A stiffening element that includes one or more integral current flowpaths may include: a first layer including carbon-fiber-reinforced thermoplastic plies; a second layer including one or more glass-fiber-reinforced thermoplastic plies; and/or a third layer including aluminum. The third layer may form an outer surface of the stiffening element. The third layer may form at least part of the one or more integral current flowpaths. A method of using a stiffening element that comprises one or more integral current flowpaths as part of a current return network for a stiffened structure may include: selecting the stiffening element that includes a first layer including carbon-fiber-reinforced thermoplastic plies, a second layer including one or more glass-fiber-reinforced thermoplastic plies, and/or a third layer including aluminum; and/or routing current from the current return network through the one or more integral current flowpaths of the selected stiffening element.

20 Claims, 18 Drawing Sheets

Related U.S. Application Data a continuation-in-part of application No. 15/378,982, filed on Dec. 14, 2016, now Pat. No. 11,014,337.

(51) Int. Cl.
*B32B 15/20* (2006.01)
*B32B 5/26* (2006.01)
*B32B 37/14* (2006.01)

(52) U.S. Cl.
CPC .............. *B32B 15/20* (2013.01); *B32B 37/14* (2013.01); *B32B 2262/101* (2013.01); *B32B 2262/106* (2013.01)

(58) Field of Classification Search
CPC ........ B32B 2262/101; B32B 2262/106; B64D 45/02; Y10T 442/138; Y10T 442/3415; Y10T 442/656; Y10T 442/3398; Y10T 428/00; Y10T 442/657; Y10T 442/3407; Y10T 442/481; Y10T 442/3423; E04C 3/00; E04C 2003/00; B29C 70/00
See application file for complete search history.

(56) References Cited

U.S. PATENT DOCUMENTS

| | | | |
|---|---|---|---|
| 4,532,169 A | 7/1985 | Carley | |
| 4,820,568 A | 4/1989 | Harpell et al. | |
| 4,867,091 A | 9/1989 | Arisato et al. | |
| 5,039,571 A | 8/1991 | Vogelesang et al. | |
| 5,066,536 A | 11/1991 | Cogswell et al. | |
| 5,227,216 A | 7/1993 | Pettit | |
| 5,688,426 A * | 11/1997 | Kirkwood | B29C 66/7392 219/633 |
| 6,037,060 A | 3/2000 | Blohowiak et al. | |
| 6,468,613 B1 * | 10/2002 | Kitano | B32B 15/08 428/35.8 |
| 6,641,893 B1 * | 11/2003 | Suresh | C03C 14/00 428/105 |
| 6,966,402 B2 | 11/2005 | Matias et al. | |
| 7,087,317 B2 | 8/2006 | Ehrstrom et al. | |
| 8,632,653 B2 | 1/2014 | Brown et al. | |
| 8,678,267 B2 | 3/2014 | Heck et al. | |
| 8,962,130 B2 | 2/2015 | Kruckenberg et al. | |
| 9,027,820 B2 | 5/2015 | Heck et al. | |
| 9,090,028 B2 | 7/2015 | McCarville et al. | |
| 9,090,043 B2 | 7/2015 | Matsen et al. | |
| 9,253,823 B2 | 2/2016 | Nordman et al. | |
| 9,358,764 B2 | 6/2016 | Prebil et al. | |
| 2002/0157859 A1 | 10/2002 | Vasoya et al. | |
| 2004/0087232 A1 | 5/2004 | Anderson et al. | |
| 2005/0175813 A1 | 8/2005 | Wingert et al. | |
| 2005/0271859 A1 | 12/2005 | Tuss et al. | |
| 2006/0143920 A1 * | 7/2006 | Morrison | B32B 15/04 29/896.6 |
| 2008/0185478 A1 | 8/2008 | Dannenberg et al. | |
| 2009/0261199 A1 | 10/2009 | McCarville et al. | |
| 2010/0068497 A1 | 3/2010 | Harrington | |
| 2010/0127564 A1 * | 5/2010 | Braden | H02G 13/00 307/9.1 |
| 2010/0264266 A1 | 10/2010 | Tsotsis | |
| 2011/0052910 A1 | 3/2011 | Gunnick et al. | |
| 2011/0278395 A1 | 11/2011 | Telgkamp et al. | |
| 2012/0177872 A1 | 7/2012 | Tsai et al. | |
| 2012/0258323 A1 * | 10/2012 | Brown | B64D 45/02 428/457 |
| 2013/0052897 A1 | 2/2013 | Rogers et al. | |
| 2013/0196121 A1 | 8/2013 | Beumler | |
| 2013/0316148 A1 | 11/2013 | Gunnink | |
| 2014/0167500 A1 | 6/2014 | Frankenberger | |
| 2014/0329069 A1 * | 11/2014 | Wilson | B32B 15/14 428/213 |
| 2016/0016381 A1 | 1/2016 | Celis Marin | |
| 2017/0101168 A1 | 4/2017 | Holemans et al. | |
| 2017/0284099 A1 * | 10/2017 | Chien | E04C 3/29 |
| 2018/0162101 A1 | 6/2018 | Stickler et al. | |
| 2018/0162102 A1 | 6/2018 | Stickler et al. | |
| 2018/0346093 A1 | 12/2018 | Trop et al. | |

FOREIGN PATENT DOCUMENTS

| | | |
|---|---|---|
| WO | 2011064263 A3 | 6/2011 |
| WO | 2016082599 A1 | 6/2016 |

OTHER PUBLICATIONS

Author Unknown, "Aluminum 1100", Alloy Digest, ASM International, 2002, 2 pages.

Lamontia et al., "Manufacturing Flat and Cylindrical Laminates and Built up Structure Using Automated Thermoplastic Tape Laying, Fiber Placement, and Filament Winding", 2002, 15 pages.

Agy, Product Information, S-2 Glass Fibers, High Strength Solutions To Your Toughest Reinforcement Challenges, Mar. 2004, 2 pages.

Reyes, "Manufacturing of New Low-Cost Lightweight Thermoplastic-Composite/Metal Hybrid Systems", Univ. of Michigan-Dearborn, Center for Engineering Education and Practice, 2005, 24 pages.

Automated Dynamics, Continuous S-2 Glass/PEEK Composite Typical Material Properties, 2007, 2 pages.

Carrillo et al., "Mechanical properties of a novel fiber-metal laminate based on a polypropylene composite", Mechanics of Materials, 41 (2009), pp. 828-838.

Sinke, J (2009). Manufacturing principles for fiber metal laminates. In W. Bank & M.R. Wisnom (Eds.), Proceedings of ICCM-17 (pp. 1-10). London: IOM.

Buser, "PEKK—the attractive alternative to PEEK Buser Nr. B25003", 2011, 1 page.

Cytec, Technical Data Sheet, APC-2-PEEK Thermoplastic Polymer, 2012, 9 pages.

Cytec, Technical Data Sheet, PEKK Thermoplastic Polymer, 2012, 6 pages.

Cytec, Technical Data Sheet, APC-2 PEEK Thermoplastic Polymer, Mar. 19, 2012, 10 pages.

Cytec, Technical Data Sheet, PEKK Thermoplastic Polymer, Mar. 20, 2012, 6 pages.

Agy, Product Information, 933 S-2 Glass Yarn, 2013, 2 pages.

Agy, Product Information, GLARE Laminate with S-2 Glass Fiber, 2013, 2 pages.

Hexcel, HexTow AS4D 4000 Carbon Fiber, Product Data, 2013, 2 pages.

Livingston-Peters, "An Investigation Into the Properties and Fabrication Methods of Thermoplastic Composites", Thesis, Jun. 2014, 34 pages.

Cytec Solvay Group, APC PEKK, 2016, 1 page.

Cytec Solvay Group, APC-2 PEEK, 2016, 1 page.

Abouhamzeh, "Distortions and Residual Stresses of GLARE Induced by Manufacturing", Thesis, 2016, 148 pages.

Stickler et al., "Material Systems and Methods of Manufacturing Material Systems", U.S. Appl. No. 15/378,931.

Stickler et al., "Laminate Structures Comprising Fiber-Reinforced Thermoplastic Prepreg Plies", U.S. Appl. No. 15/378,982.

U.S. Appl. No. 15/610,598, filed May 31, 2017; specification, abstract, and drawings.

Extended European Search Report dated Mar. 21, 2018, in related European Patent Application No. 17206292.9, 9 pages.

Extended European Search Report dated Apr. 5, 2018, in related European Patent Application No. 17203697.2, 8 pages.

Office Action dated Jul. 13, 2018, in related U.S. Appl. No. 15/378,982.

Office Action dated Aug. 28, 2018, in related U.S. Appl. No. 15/378,931.

Botelho et al., "Evaluation of adhesion of continuous fiber-epoxy composite/aluminum laminates," Journal of Adhesion Science and Technology, vol. 18, No. 15-16, pp. 1799-1813 (2004).

(56) References Cited

OTHER PUBLICATIONS

Yu, Qianqian (EP Examiner), Communication Pursuant to 94(3) EPC dated Sep. 25, 2019, in related European Application No. 17 203 697.2 (4 pages).
Yu, Qianqian (EP Examiner), Communication Pursuant to 94(3) EPC dated Sep. 20, 2019, in related European Application No. 17 206 292.9 (4 pages).
First Notification of Office Action dated Dec. 17, 2020, in corresponding Chinese Application No. 201711041430.8, 24 pages (includes English translation).
Second Notification of Office Action dated Jun. 4, 2021, in corresponding Chinese Application No. 201711041430.8, 21 pages (includes English translation).

* cited by examiner

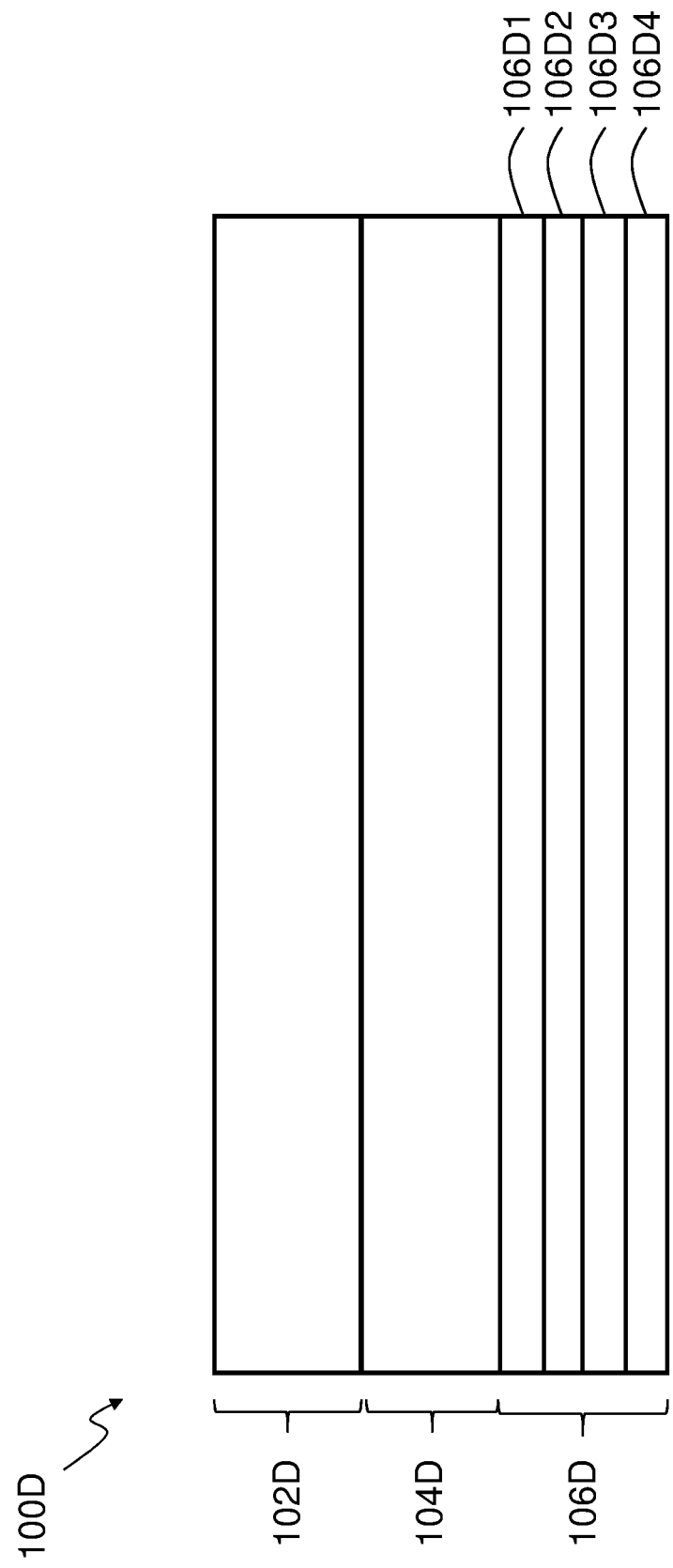

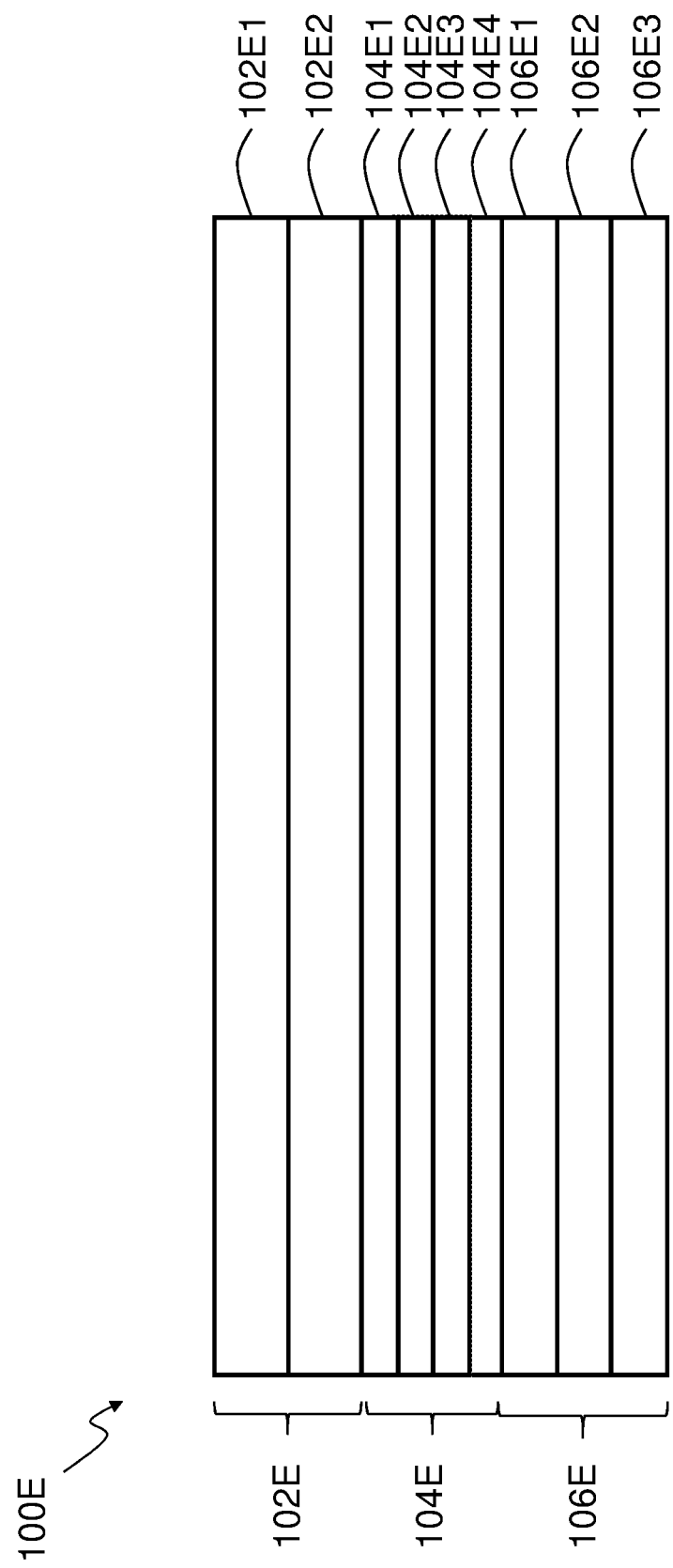

STIFFENING ELEMENTS THAT COMPRISE INTEGRAL CURRENT FLOWPATHS

CROSS-REFERENCE TO RELATED APPLICATION(S)

This application is a continuation-in-part of U.S. patent application Ser. No. 15/378,931, filed on Dec. 14, 2016, in the U.S. Patent and Trademark Office ("USPTO") (now U.S. Pat. No. 11,077,644 B2); and is a continuation-in-part of U.S. patent application Ser. No. 15/378,982, filed on Dec. 14, 2016, in the USPTO (now U.S. Pat. No. 11,014,337 B2); the entire contents of both of which are incorporated herein by reference.

FIELD

The subject matter described herein generally relates to stiffening elements and methods of using stiffening elements. More particularly, the subject matter disclosed herein relates to stiffening elements that comprise one or more integral current flowpaths. The subject matter disclosed herein also relates to methods of using stiffening elements that comprise one or more integral current flowpaths as part of current return networks for stiffened structures.

BACKGROUND

Stiffening elements may comprise fiber-reinforced thermoplastic prepreg plies. The fiber-reinforced thermoplastic prepreg plies may be, for example, glass-fiber-reinforced thermoplastic prepreg plies. The fiber-reinforced thermoplastic prepreg plies may be, for example, carbon-fiber-reinforced thermoplastic prepreg plies.

Stiffening elements also may comprise, for example, aluminum, glass composite, and/or carbon composite layers. The glass composite layer(s) may comprise the glass-fiber-reinforced thermoplastic prepreg plies. The carbon composite layer(s) may comprise the carbon-fiber-reinforced thermoplastic prepreg plies. Such stiffening elements may fall, for example, in the fiber metal laminate ("FML") category. FMLs may exhibit specific advantages when compared to simple metal structures. Such advantages may include, for example, improved resistance to corrosion, fatigue, fire, and/or impact. In addition or in the alternative, such advantages may include, for example, integral electromagnetic effects ("EME") conductivity. In addition or in the alternative, such advantages may include, for example, specialized strength properties and/or reduced weight per given volume.

Many industries, such as the aerospace, automotive, defense, electronics, maritime, and rail-transport industries, continually seek to push the boundaries of what has come before in structures such as aircraft, bridges, buildings, cars, locomotives, missiles, rockets, ships, stiffening elements, submarines, submersibles, towers, train cars, and trucks. In particular, as cost and weight reduction may be primary factors, relatively inexpensive, lighter composite materials may be substituted for relatively more expensive, heavier metals in those structures. But the composite materials may not be able to be used in the same manner as the metals, particularly with regard to electrical functions. Thus, there is a need for improved structures, such as stiffening elements.

SUMMARY

The present disclosure is directed to stiffening elements and methods of using stiffening elements.

In some examples, a stiffening element that comprises one or more integral current flowpaths may comprise: a first layer comprising a plurality of carbon-fiber-reinforced thermoplastic plies; a second layer, adjacent to the first layer, comprising one or more glass-fiber-reinforced thermoplastic plies; and/or a third layer, adjacent to the second layer and opposite to the first layer, comprising aluminum. The third layer may be configured to form an outer surface of the stiffening element. The third layer may be configured to form at least part of the one or more integral current flowpaths.

In some examples, the third layer may comprise 1000 series aluminum alloy.

In some examples, the third layer may comprise 1100 aluminum alloy.

In some examples, the plurality of carbon-fiber-reinforced thermoplastic plies may comprise thermoplastic resin.

In some examples, the thermoplastic resin may comprise polyetheretherketone ("PEEK") or polyetherketoneketone ("PEKK").

In some examples, the one or more glass-fiber-reinforced thermoplastic plies may comprise thermoplastic resin.

In some examples, the thermoplastic resin may comprise PEEK or PEKK.

In some examples, the plurality of carbon-fiber-reinforced thermoplastic plies may comprise first thermoplastic resin, the one or more glass-fiber-reinforced thermoplastic plies may comprise second thermoplastic resin, and/or the first thermoplastic resin may be the same as the second thermoplastic resin.

In some examples, the plurality of carbon-fiber-reinforced thermoplastic plies may comprise first thermoplastic resin, the one or more glass-fiber-reinforced thermoplastic plies may comprise second thermoplastic resin, and/or the first thermoplastic resin may differ from the second thermoplastic resin.

In some examples, a stiffening element that comprises one or more integral current flowpaths may comprise: a first layer comprising a first aluminum layer; a second layer, adjacent to the first layer, comprising one or more first glass-fiber-reinforced thermoplastic plies; a third layer, adjacent to the second layer and opposite to the first layer, comprising a plurality of carbon-fiber-reinforced thermoplastic plies; a fourth layer, adjacent to the third layer and opposite to the second layer, comprising one or more second glass-fiber-reinforced thermoplastic plies; and/or a fifth layer, adjacent to the fourth layer and opposite to the third layer, comprising a second aluminum layer. The fifth layer may be configured to form a first outer surface of the stiffening element. The fifth layer may be configured to form at least part of the one or more integral current flowpaths.

In some examples, the first layer may be configured to form a second outer surface of the stiffening element.

In some examples, the first and second aluminum layers may comprise a same aluminum alloy.

In some examples, the first and second aluminum layers may comprise different aluminum alloys.

In some examples, the first layer may be configured to form at least part of the one or more integral current flowpaths.

In some examples, the first layer may be configured to form at least part of a first flowpath of the one or more integral current flowpaths, the fifth layer may be configured to form at least part of a second flowpath of the one or more integral current flowpaths, and/or the first flowpath may differ from the second flowpath.

In some examples, current flow in the first flowpath may be substantially parallel to and in a same direction as current flow in the second flowpath.

In some examples, current flow in the first flowpath may be substantially parallel to but in an opposite direction from current flow in the second flowpath.

In some examples, a method of using a stiffening element that comprises one or more integral current flowpaths as part of a current return network for a stiffened structure may comprise: selecting the stiffening element comprising a first layer that comprises a first aluminum layer, a second layer adjacent to the first layer that comprises one or more first glass-fiber-reinforced thermoplastic plies, a third layer adjacent to the second layer and opposite to the first layer that comprises a plurality of carbon-fiber-reinforced thermoplastic plies, a fourth layer adjacent to the third layer and opposite to the second layer that comprises one or more second glass-fiber-reinforced thermoplastic plies, a fifth layer adjacent to the fourth layer and opposite to the third layer that comprises a second aluminum layer, wherein the fifth layer is configured to form a first outer surface of the stiffening element, and wherein the fifth layer is configured to form at least part of the one or more integral current flowpaths; and/or routing current from the current return network through the one or more integral current flowpaths of the selected stiffening element.

In some examples, the routing of the current from the current return network may comprise routing the current from the current return network through the fifth layer.

In some examples, the stiffening element may comprise first and second integral current flowpaths, and/or the routing of the current from the current return network may comprise routing the current from the current return network through the first and second integral current flowpaths.

In some examples, current flow in the first integral current flowpath may be substantially parallel to and in a same direction as current flow in the second integral current flowpath, or the current flow in the first integral current flowpath may be substantially parallel to but in an opposite direction from the current flow in the second integral current flowpath.

In some examples, a stiffening element that comprises one or more integral current flowpaths may comprise: a first layer comprising a plurality of carbon-fiber-reinforced thermoplastic plies configured to form a first surface and a second surface, where the first surface is opposite to the second surface; a second layer, adjacent to the first surface, comprising one or more first glass-fiber-reinforced thermoplastic plies; a third layer, adjacent to the second surface, comprising one or more second glass-fiber-reinforced thermoplastic plies; a fourth layer, adjacent to the second layer and opposite to the first layer, comprising a first aluminum layer; and/or a fifth layer, adjacent to the third layer and opposite to the first layer, comprising a second aluminum layer. The fourth layer may be configured to form a first outer surface of the stiffening element. The fourth layer may be configured to form at least part of the one or more integral current flowpaths.

In some examples, the fifth layer may be configured to form a second outer surface of the stiffening element.

In some examples, the first and second aluminum layers may comprise a same aluminum alloy.

In some examples, the first and second aluminum layers may comprise different aluminum alloys.

In some examples, the fifth layer may be configured to form at least part of the one or more integral current flowpaths.

In some examples, the fourth layer may be configured to form at least part of a first flowpath of the one or more integral current flowpaths, the fifth layer may be configured to form at least part of a second flowpath of the one or more integral current flowpaths, and/or the first flowpath may be different from the second flowpath.

In some examples, current flow in the first flowpath may be substantially parallel to and in a same direction as current flow in the second flowpath.

In some examples, current flow in the first flowpath may be substantially parallel to but in an opposite direction from current flow in the second flowpath.

In some examples, a method of using a stiffening element that comprises one or more integral current flowpaths as part of a current return network for a stiffened structure may comprise: selecting the stiffening element comprising a first layer that comprises a plurality of carbon-fiber-reinforced thermoplastic plies configured to form a first surface and a second surface where the first surface is opposite to the second surface, a second layer adjacent to the first surface that comprises one or more first glass-fiber-reinforced thermoplastic plies, a third layer adjacent to the second surface that comprises one or more second glass-fiber-reinforced thermoplastic plies, a fourth layer adjacent to the second layer and opposite to the first layer that comprises a first aluminum layer, and a fifth layer adjacent to the third layer and opposite to the first layer that comprises a second aluminum layer, wherein the fourth layer is configured to form a first outer surface of the stiffening element, and wherein the fourth layer is configured to form at least part of the one or more integral current flowpaths; and/or routing current from the current return network through the one or more integral current flowpaths of the selected stiffening element.

In some examples, the routing of the current from the current return network may comprise routing the current from the current return network through the fourth layer.

In some examples, the stiffening element may comprise first and second integral current flowpaths, and/or the routing of the current from the current return network may comprise routing the current from the current return network through the first and second integral current flowpaths.

In some examples, current flow in the first integral current flowpath may be substantially parallel to and in a same direction as current flow in the second integral current flowpath, or the current flow in the first integral current flowpath may be substantially parallel to but in an opposite direction from the current flow in the second integral current flowpath.

In some examples, a method of using a stiffening element that comprises one or more integral current flowpaths as part of a current return network for a stiffened structure may comprise: selecting the stiffening element comprising a first layer comprising a plurality of carbon-fiber-reinforced thermoplastic plies, a second layer adjacent to the first layer comprising one or more glass-fiber-reinforced thermoplastic plies, and a third layer adjacent to the second layer and opposite to the first layer comprising aluminum, wherein the third layer is configured to form an outer surface of the stiffening element, and wherein the third layer is configured to form at least part of the one or more integral current flowpaths; and/or routing current from the current return network through the one or more integral current flowpaths of the selected stiffening element.

In some examples, the routing of the current from the current return network may comprise routing the current from the current return network through the third layer.

It is to be understood that both the foregoing general description and the following detailed description are exemplary and explanatory only, and are not restrictive of the present teachings, as claimed.

DRAWINGS

The above and/or other aspects and advantages will become more apparent and more readily appreciated from the following detailed description of examples, taken in conjunction with the accompanying drawings, in which:

FIG. 1D shows a stiffening element, according to some examples of the disclosed stiffening elements;

FIG. 1E shows a stiffening element, according to some examples of the disclosed stiffening elements;

Figure 4A:
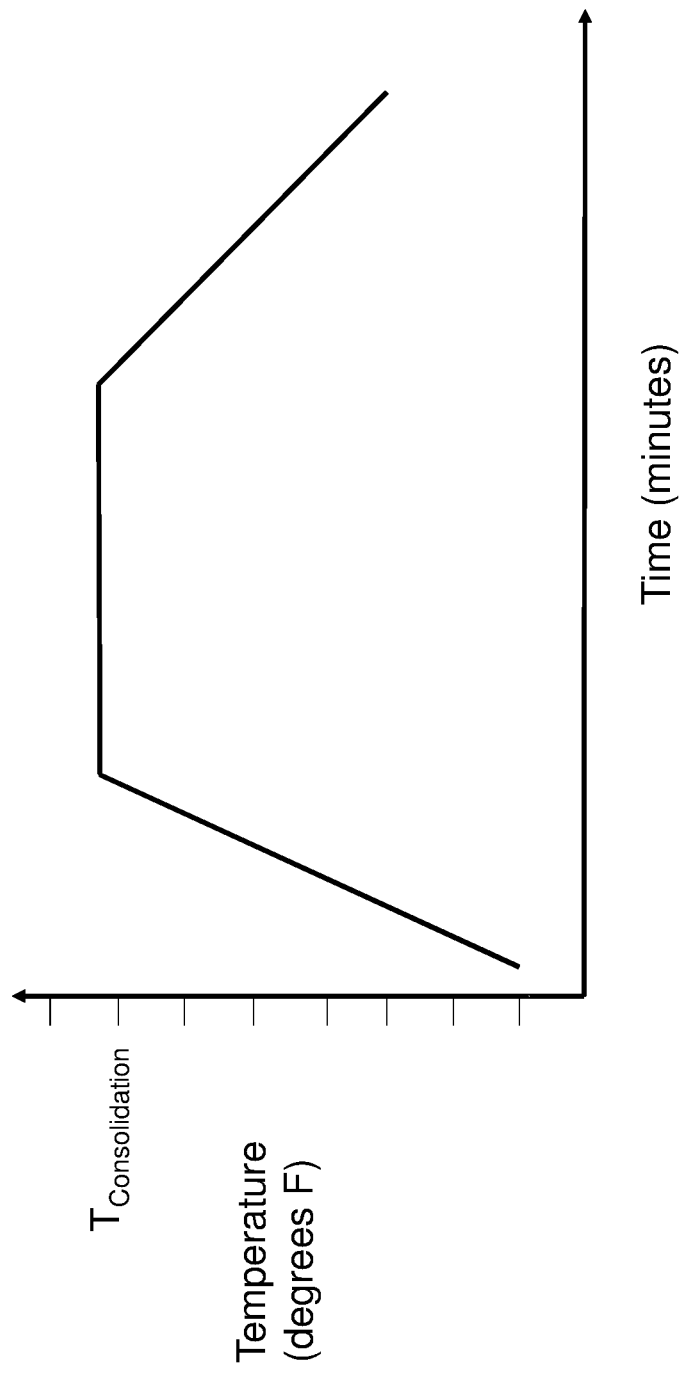
FIG. 4A shows a temperature versus time profile for consolidating one or more thermoplastic prepreg plies at a temperature sufficient to soften an aluminum layer, or for adjusting the temperature and pressure of a stack, according to some examples of the disclosed stiffening elements.
Figure 4B:
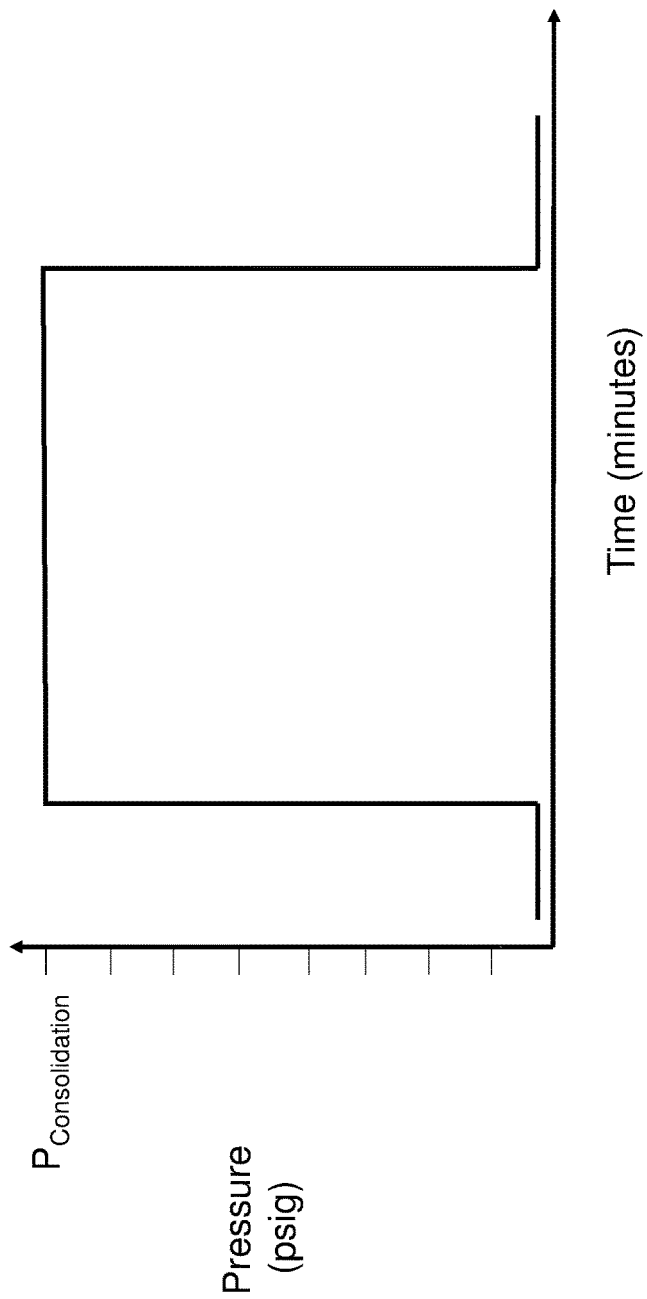
FIG. 4B shows a pressure versus time profile for consolidating one or more thermoplastic prepreg plies at a temperature sufficient to soften an aluminum layer, or for adjusting the temperature and pressure of a stack, according to some examples of the disclosed stiffening elements.
Figure 4C:
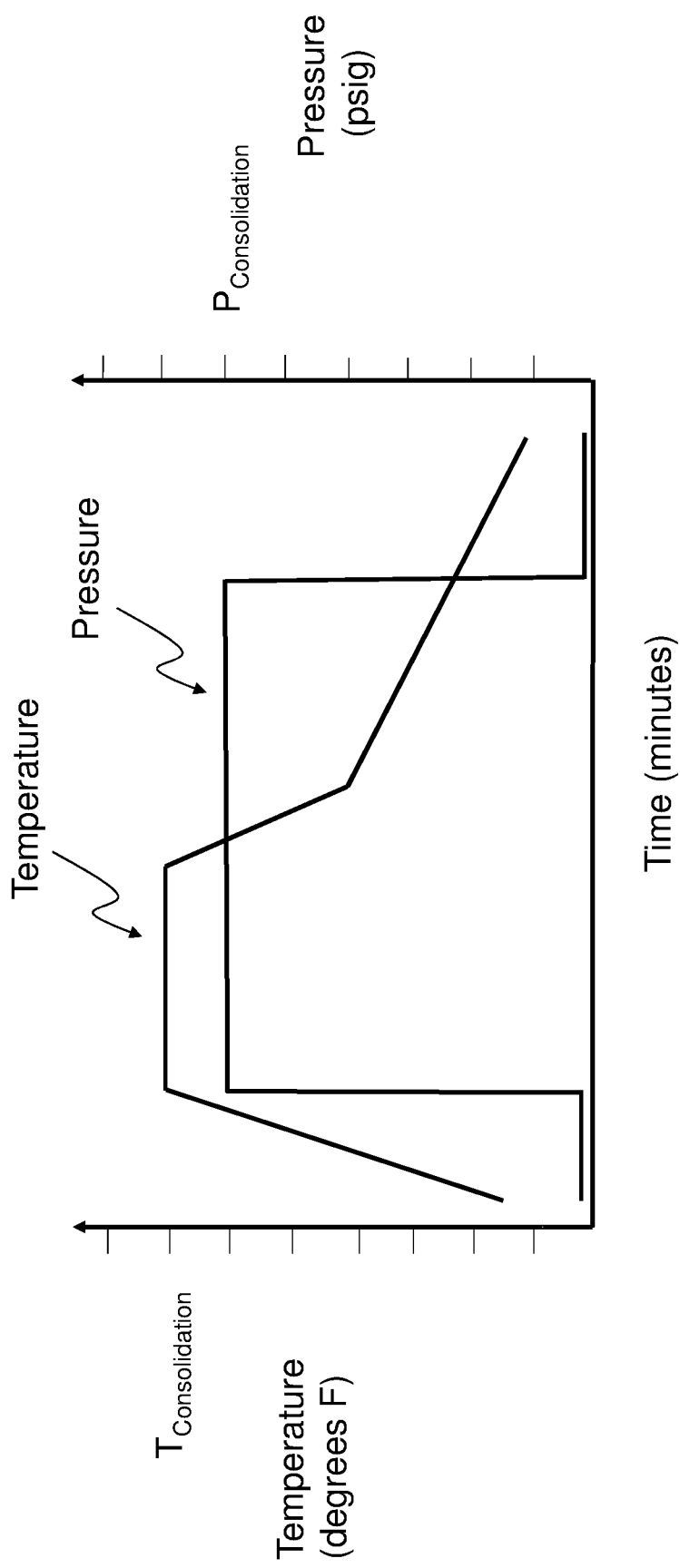
Figure 5:
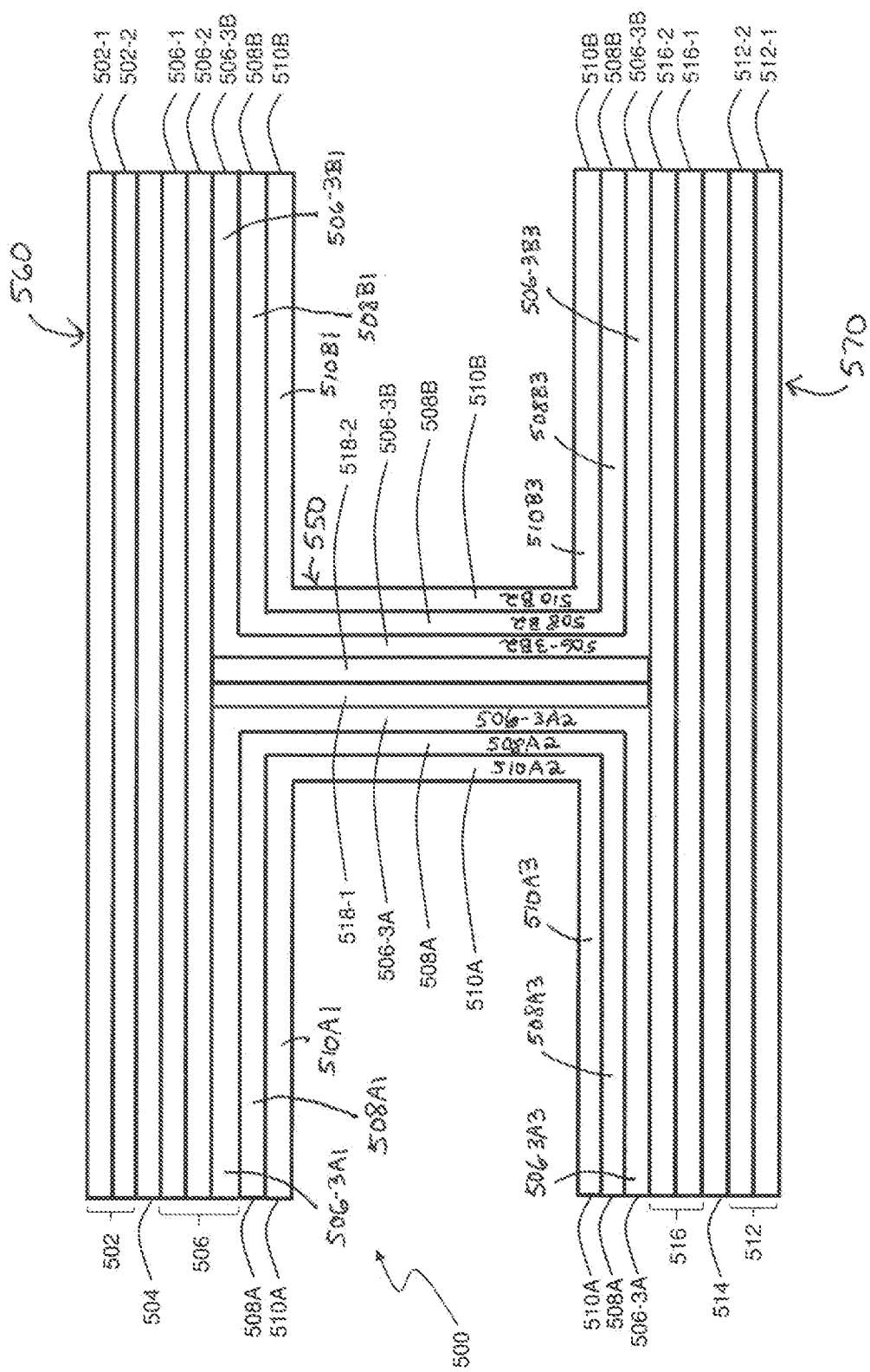

FIG. 4C shows a temperature and pressure versus time profile for consolidating one or more thermoplastic prepreg plies at a temperature sufficient to soften an aluminum layer, or for adjusting the temperature and pressure of a stack, according to some examples of the disclosed stiffening elements; and FIG. 5 shows a stiffening element, according to some examples of the disclosed stiffening elements.

DETAILED DESCRIPTION

Exemplary aspects will now be described more fully with reference to the accompanying drawings. Examples of the disclosure, however, may be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

As discussed above, many industries continually seek to push the boundaries of what has come before in structures such as aircraft, bridges, buildings, cars, locomotives, missiles, rockets, ships, stiffening elements, submarines, submersibles, towers, train cars, and trucks. In particular, as cost and weight reduction may be primary factors, relatively inexpensive, lighter composite materials may be substituted for relatively more expensive, heavier metals in those structures. The relatively lighter composite materials may be equally strong or even stronger than the relatively heavier metals, but the composite materials may not be able to be used in the same manner as the metals, particularly with regard to electrical functions.

In response to these and related concerns, some industries (e.g., aerospace) may incorporate additional current flowpaths into their products (e.g., aircraft). For example, concerns due to the substitution of composite materials for conductive aluminum and other metallic structures in an aircraft may be addressed using a current return network ("CRN"). Such a CRN, for example, may internally connect various preexisting metallic structures distributed in the aircraft with wiring so as to provide, for example, EME conductivity (e.g., protection from high-intensity radiated fields ("HIRE"), lightning-strike protection ("LSP")) as part of an airframe electrical grounding system (e.g., metallic ground plane), although potentially adding weight and complexity. Such a CRN may include multiple paths, connected in parallel, to provide redundant current flowpaths. The multiple paths may be separated within the aircraft to provide additional protection against internal or external threats (e.g., upper crown and lower bilge area of main fuselage, leading and trailing edges of wings).

Portions of such CRNs may be fabricated, for example, with aluminum extrusions. Such aluminum extrusions may be made with non-structural-grade aluminum having relatively low resistivity values, as opposed to relatively higher resistivity values often associated with structural-grade aluminum. However, the aluminum extrusions made with non-structural-grade aluminum may not be as structurally efficient and stiff (e.g., self-supporting) as some traditional composite materials. But traditional composite materials may not be as electrically conductive as such aluminum extrusions made with non-structural-grade aluminum.

In response to these and related concerns in the aerospace industry and other industries, the present disclosure is directed to stiffening elements. Such stiffening elements may be lightweight, strong, and corrosion resistant, and may comprise one or more integral current flowpaths. An overall modulus of elasticity for the stiffening elements, for example, may be greater than or equal to $5 \times 10^6$ pounds per square inch and less than or equal to $20 \times 10^6$ pounds per square inch. Non-rigid joints and attachments (e.g., fasteners, splice plates, collared bolts) for such stiffening elements, and conductivity between sections (e.g., electrical jumper straps), may accommodate thermal expansion and flexure.

As known to one of ordinary skill in the art, traditional CRNs may comprise, for example, a combination of systems structures, aluminum structures, titanium structures, and/or dedicated CRN components. The disclosed stiffening elements may replace at least such dedicated CRN components and/or such aluminum structures. In addition or in the alternative, the disclosed stiffening elements may be used to render a CRN independent of such systems structures and/or titanium structures.

Figure 1A:
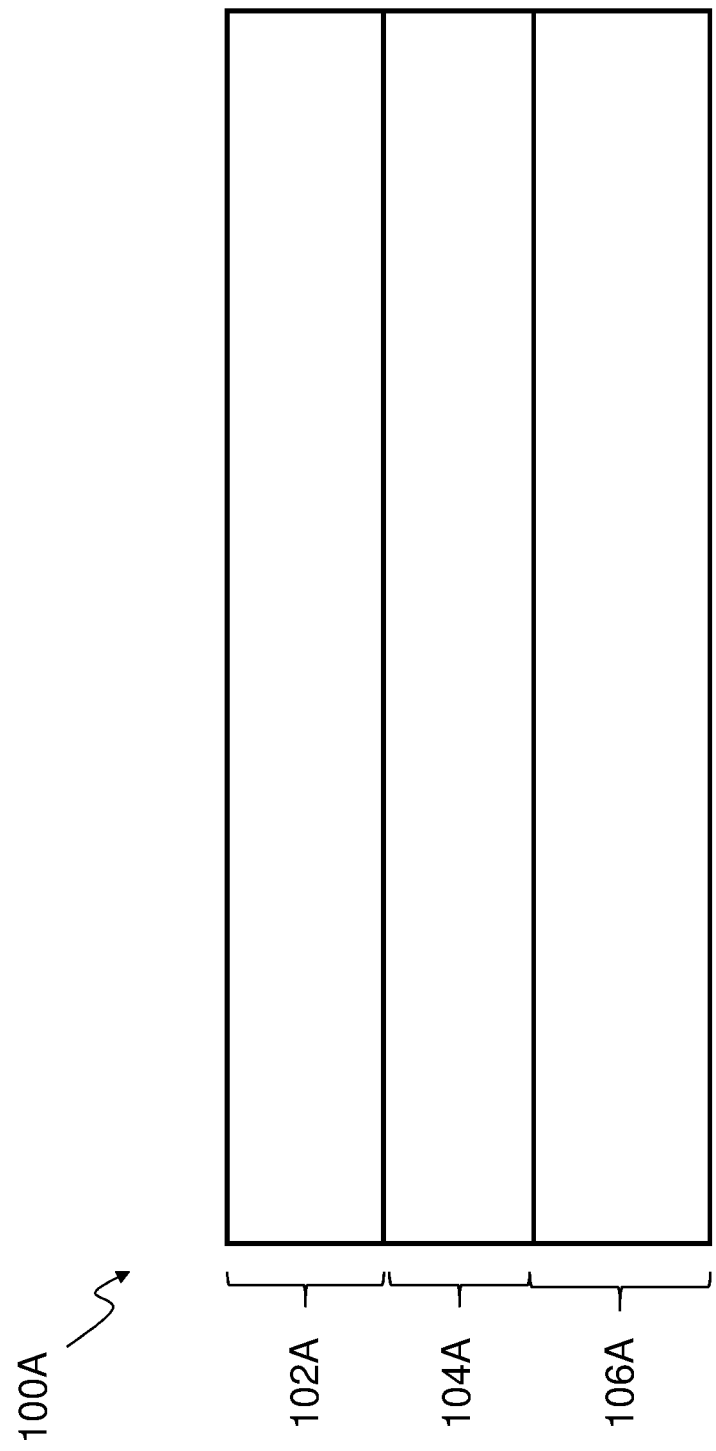
FIG. 1A shows a stiffening element, according to some examples of the disclosed stiffening elements.

FIG. 1A shows stiffening element 100A, according to some examples of the disclosed stiffening elements. As shown in FIG. 1A, stiffening element 100A comprises: aluminum layer 102A; glass composite layer 104A adjacent to aluminum layer 102A; and carbon composite layer 106A adjacent to glass composite layer 104A, and opposite to aluminum layer 102A.

Glass composite layer 104A may comprise one or more glass-fiber-reinforced thermoplastic prepreg plies. Carbon composite layer 106A may comprise one or more carbon-fiber-reinforced thermoplastic prepreg plies.

As used herein, the term "prepreg" is an abbreviation for "pre-impregnated" composite fibers in which a matrix material, such as thermoplastic resin, is already present in the fiber reinforcement before molding occurs. Prepreg manufacturing techniques may be employed to manufacture composite parts for a variety of commercial uses including, for example, the manufacture of aircraft and/or spacecraft.

As used herein, the term "prepreg plies" includes both prepreg fabrics and prepreg tapes.

Stiffening element 100A may provide, for example, reduced weight per given volume as compared to simple metal structures.

Aluminum layer 102A may be configured to form the outer surface of stiffening element 100A or an outer surface of stiffening element 100A. Heat transfer via conduction, convection, and/or radiation near and/or at outer surfaces of a stiffening element (e.g., stiffening element 100A) may limit potential heating damage to the stiffening element.

Stiffening element 100A may comprise one or more integral current flowpaths. Aluminum layer 102A may be configured to form at least part of the one or more integral current flowpaths.

As used herein, the term "integral current flowpath" means that the current flowpath is provided by stiffening element 100A itself, and is not reliant upon other components, particularly other metallic components that might add weight to stiffening element 100A (e.g., added copper foil or mesh). The EME conductivity also is not reliant upon, for example, ply-integrated interwoven wires (e.g., interwoven wire fabric), conductive nonwoven veils, conductive paints, or conductive surfacing films.

Aluminum layer 102A, glass composite layer 104A, and carbon composite layer 106A may have the same or different thicknesses.

Aluminum layer 102A may or may not have aluminum sublayers; glass composite layer 104A may or may not have glass composite sublayers; and/or carbon composite layer 106A may or may not have carbon composite sublayers.

As used herein, the term "aluminum" means the metallic element of atomic number 13, including any isotopes thereof.

As used herein, the term "alloy" means a solid or liquid mixture of two or more metals, or of one or more metals with one or more nonmetallic elements, as in carbon steels.

As used herein, the term "layer" means a thickness of material laid on, formed on, or spread over a surface, body, or portion of a surface or body. A layer may cover the surface, body, or portion of the surface or body, or form an overlying part or segment of material that covers the surface, body, or portion of the surface or body. A layer may have constant or variable thickness.

As used herein, the term "aluminum layer" means a layer comprising aluminum. An aluminum layer may comprise, for example, pure aluminum, an aluminum alloy, or some other substance that comprises aluminum. The aluminum layer may comprise, for example, 1100 series aluminum (e.g., a commercially pure alloy of aluminum, such as 1100-O, 1100-H12, 1100-H14, 1100-H16, 1100-H18, 1100-H22, 1100-H24, 1100-H26, 1100-H28, 1100-H112, or 1100-H113 aluminum according to the International Alloy Designation System ("IADS")). More generally, the aluminum layer may comprise, for example, a 1000 series aluminum alloy (e.g., aluminum alloy 1050, 1060, 1100, 1145, 1199, 1200, 1230, or 1350 according to IADS); a 2000 series aluminum alloy (e.g., aluminum alloy 2008, 2011, 2014, 2017, 2018, 2024, 2025, 2036, 2048, 2090, 2117, 2124, 2127, 2195, 2218, 2219, 2224, 2319, 2324, 2524, or 2618 according to IADS); a 3000 series aluminum alloy (e.g., aluminum alloy 3003, 3004, 3005, 3102, or 3105 according to IADS); a 5000 series aluminum alloy (e.g., aluminum alloy 5005, 5050, 5052, 5056, 5059, 5083, 5086, 5154, 5182, 5183, 5252, 5254, 5356, 5357, 5454, 5456, 5457, 5554, 5556, 5652, 5654, 5657, or 5754 according to IADS); a 6000 series aluminum alloy (e.g., aluminum alloy 6003, 6005, 6005A, 6009, 6010, 6013, 6016, 6053, 6060, 6061, 6062, 6063, 6066, 6070, 6082, 6101 (e.g., 6101-H111, 6101-T64), 6105, 6111, 6151, 6162, 6201, 6205, 6253, 6262, 6351, 6463, or 6951 according to IADS); or a 7000 series aluminum alloy (e.g., aluminum alloy 7001, 7005, 7008, 7022, 7039, 7049, 7050, 7055, 7068, 7072, 7075, 7076, 7079, 7108, 7116, 7129, 7150, 7175, 7178, or 7475 according to IADS).

The pure aluminum, aluminum alloys, and/or other substances that comprise aluminum discussed above may be compatible with high-temperature processing (e.g., at temperatures required for thermoplastic processing or consolidation, such as ≥600° F., ≥650° F., ≥675° F., or ≥700° F., but less than the melting temperature of the pure aluminum, aluminum alloys, and/or other substances that comprise aluminum). For example, the pure aluminum, aluminum alloys, and/or other substances that comprise aluminum discussed above may exhibit low yield strength(s) (e.g., ≤7.2×10$^3$ pounds per square inch gage ("psig"), ≤5.8×10$^3$ psig, ≤5.1×10$^3$ psig, or ≤4.3×10$^3$ psig), helping to reduce residual thermal stresses in other layers during and/or after cooldown. Other factors may help to reduce residual thermal stresses in other layers during and/or after cooldown, such as the thickness of the pure aluminum, aluminum alloys, and/or other substances that comprise aluminum discussed above; the existence and number of sublayers of the pure aluminum, aluminum alloys, and/or other substances that comprise aluminum discussed above; and/or whether the pure aluminum, aluminum alloys, and/or other substances that comprise aluminum discussed above are in direct contact with a specific adjacent layer (e.g., a glass composite layer).

The pure aluminum, aluminum alloys, and/or other substances that comprise aluminum discussed above may exhibit high electrical conductivity (e.g., ≥45% per the International Annealed Copper Standard ("IACS"), ≥50% IACS, ≥55% IACS, or ≥57% IACS), helping to conduct electricity (e.g., power returns, steady state current returns, fault current returns) and/or to provide integral electromagnetic effects ("EME") conductivity (e.g., protection from high-intensity radiated fields ("HIRF"), lightning-strike protection ("LSP")), for example, in weight-efficient composite aircraft structures. Other factors may help to conduct electricity and/or to provide integral EME conductivity, such as the thickness of the pure aluminum, aluminum alloys, and/or other substances that comprise aluminum discussed above; the existence and number of sublayers of the pure aluminum, aluminum alloys, and/or other substances that comprise aluminum discussed above; and/or whether the pure aluminum, aluminum alloys, and/or other substances that comprise aluminum discussed above are in direct contact with an airframe electrical grounding system (e.g., metallic ground plane).

In addition to conductivity and resistivity, other material properties (e.g., corrosion resistance) and physical dimensions (e.g., cross-sectional area) may be important in ensuring that stiffening elements have the required level of current handling capability.

As used herein, the term "integral EME conductivity" means that the EME conductivity is provided by stiffening element 100A itself, and is not reliant upon other components, particularly other metallic components that might add weight to stiffening element 100A (e.g., added copper foil or mesh). The EME conductivity also is not reliant upon, for example, ply-integrated interwoven wires (e.g., interwoven wire fabric), conductive nonwoven veils, conductive paints, or conductive surfacing films.

The pure aluminum, aluminum alloys, and/or other substances that comprise aluminum discussed above may exhibit high thermal conductivity (e.g., ≥70 British thermal units/hour-foot-degree Fahrenheit ("BTU/hr-ft-° F."), ≥85 BTU/hr-ft-° F., ≥100 BTU/hr-ft-° F., ≥115 BTU/hr-ft-° F., or ≥130 BTU/hr-ft-° F., helping to transfer, dissipate, and/or distribute thermal energy of the stiffening elements. Other factors may help to transfer, dissipate, and/or distribute thermal energy, such as the thickness of the pure aluminum, aluminum alloys, and/or other substances that comprise aluminum discussed above; the existence and number of sublayers of the pure aluminum, aluminum alloys, and/or other substances that comprise aluminum discussed above; and/or whether the pure aluminum, aluminum alloys, and/or other substances that comprise aluminum discussed above are in direct contact with a specific adjacent layer and/or an airframe electrical grounding system (e.g., metallic ground plane).

Surfaces of the aluminum layer may undergo surface preparation, such as alkaline degreasing, chromic acid anodizing or other anodizing processing, priming (e.g., with BR 127 corrosion-inhibiting primer), sol-gel, and/or pickling in chromic-sulfuric acid. The surfaces also may be roughened, for example, by abrasion. Such surface preparation may enhance bonding between the aluminum layer(s) and other layers.

The aluminum layer(s) may be depended on to provide current-carrying capacity for the stiffening element. Generally, in such cases, the number and/or thickness of the aluminum layer(s) are greater than when the aluminum layer(s) are not depended on to provide current-carrying capacity.

The aluminum layer(s) may be depended on to provide integral EME conductivity for the stiffening element. Generally, in such cases, the number and/or thickness of the aluminum layer(s) are greater than when the aluminum layer(s) are not depended on to provide integral EME conductivity.

The aluminum layer(s) may be depended on to provide thermal conductivity for the stiffening element. For example, the thermal conductivity may assist in a heat sink function via a CRN. Generally, in such cases, the number and/or thickness of the aluminum layer(s) are greater than when the aluminum layer(s) are not depended on to provide thermal conductivity.

The aluminum layer(s) may be depended on to provide significant structural support. Generally, in such cases, the number and/or thickness of the aluminum layer(s) are greater than when the aluminum layer(s) are not depended on to provide significant structural support. Whether or not depended on to provide significant structural support, thicknesses of the aluminum layer(s) may be, for example, ≥0.005 inches and ≤0.020 inches (e.g., 0.005 inches, 0.010 inches, 0.015 inches, or 0.020 inches). When depended on to provide significant structural support, thicknesses of the aluminum layer(s) may be even greater than 0.0020 inches.

As used herein, the term "composite" means a mixture or mechanical combination on a macroscale of two or more materials that are solid in the finished state, are mutually insoluble, and differ in chemical nature.

As used herein, the term "tenacity" means the strength per unit weight of a fiber, typically expressed in grams per denier.

As used herein, the term "fiber" means a fundamental form of solid (usually crystalline) characterized by relatively high tenacity and an extremely high ratio of length to diameter (e.g., several hundred or more to one). Semisynthetic fibers include inorganic substances extruded in fibrous form using, for example, carbon or glass. Synthetic fibers include substances extruded in fibrous form using, for example, high polymers.

As used herein, the term "glass" means a non-crystalline, amorphous solid. The glass may comprise, for example, a ceramic material comprising a mixture of silica, soda ash, and lime. The glass may comprise, for example, one or more of C-glass, E-glass, S-glass, or T-glass. The glass may be, for example, in the form of glass fibers (e.g., fiberglass). The glass may comprise, for example, S-2 glass (e.g., S-2 glass fibers).

The glass fibers may be woven or nonwoven (e.g., chopped, matted, or randomly oriented). The strength of the woven fibers may vary with the type of weave and/or the orientation of the woven fibers (e.g., if the woven fibers are oriented in parallel, the strength of the woven fibers as a group should be greater in directions parallel to that orientation). The type of weave may be, for example, a plain weave (e.g., 1×1), a twill weave (e.g., 2×2), a basket weave, a fish weave, a harness weave, a leno weave, a satin weave, or a unidirectional weave.

As used herein, the term "matrix" means a substance used to hold together strength members of a composite, where the substance is one of the two or more materials of the composite.

As used herein, the term "resin" means a semisolid or solid complex amorphous mix of organic compounds.

As used herein, the term "monomer" means a molecule or compound, usually comprising carbon, and of relatively low molecular weight and simple structure.

As used herein, the term "polymer" means a macromolecule formed by the chemical union of five or more identical monomers. A polymer may be, for example, inorganic or organic. An organic polymer may be, for example, natural or synthetic (e.g., man-made). A synthetic organic polymer may be, for example, thermoplastic or thermosetting.

As used herein, the term "high polymer" means an organic polymer having a molecular weight ≥5,000 grams/mole.

As used herein, the term "thermoplastic" means a high polymer, as defined above, that softens when exposed to heat and returns to its original condition when cooled to room temperature. A thermoplastic polymer may be, for example, amorphous or semi-crystalline. A thermoplastic polymer may comprise, for example, one or more of polyaryletherketone ("PAEK"), polyetherimide ("PEI"), or polyphenylene sulfide ("PPS"). A polyaryletherketone may comprise, for example, one or more of polyetherketone ("PEK"), polyetheretherketone ("PEEK"), polyetherketoneketone ("PEKK"), polyetheretherketoneketone ("PEEKK"), or polyetherketoneetherketoneketone ("PEKEKK").

As used herein, the term "thermosetting polymer" means a high polymer, as defined above, that crosslinks upon the application of heat, and solidifies or "sets" irreversibly.

As used herein, the term "glass composite layer" means a layer comprising a composite that comprises glass. The glass may be, for example, in the form of glass fibers. The glass fibers in the glass composite layer may have no specific orientation (e.g., omnidirectional) or may be oriented in one or more directions (e.g., unidirectional, bidirectional, or multidirectional). The glass fibers may be aligned, continuous, and/or unidirectional.

A glass composite layer comprises, for example, a matrix. The matrix may comprise, for example, resin. The resin may comprise, for example, a thermoplastic polymer. The thermoplastic polymer may comprise, for example, one or more of PEEK (PEEK has a relatively high glass transition temperature (about 290° F.) and melting temperature (about 650° F.), allowing for high-temperature processing), PEKK (PEKK has a relatively high glass transition temperature (about 315° F.) and melting temperature (about 640° F.), allowing for high-temperature processing), or other thermoplastic polymers. A glass composite layer may comprise, for example, glass-fiber-reinforced polymer(s). A glass composite layer may comprise, for example, glass-fiber-reinforced thermoplastic polymer(s).

The thermoplastic resin of the one or more glass-fiber-reinforced thermoplastic prepreg plies provides binding for the glass fibers. The thermoplastic resin may exhibit a sufficiently high glass transition temperature, continuous service temperature, and/or crystallite melting point so as to allow the aluminum layer(s) (e.g., aluminum layer 102A) to be softened for molding, shaping, and/or other processes associated with manufacture of the stiffening element(s).

The glass composite layer(s) may be depended on to provide significant structural support. Generally, in such cases, the number and/or thickness of the glass composite layer(s) are greater than when the glass composite layer(s) are not depended on to provide significant structural support.

Whether or not depended on to provide significant structural support, thicknesses of the glass composite layer(s) may be, for example, ≥0.0020 inches and ≤0.0080 inches (e.g., 0.0020 inches, 0.0025 inches, 0.0030 inches, 0.0035 inches, 0.0040 inches, 0.0045 inches, 0.0050 inches, 0.0055 inches, 0.0060 inches, 0.0065 inches, 0.0070 inches, 0.0075 inches, or 0.0080 inches). When depended on to provide significant structural support, thicknesses of the glass composite layer(s) may be even greater than 0.0080 inches.

Whether or not depended on to provide significant structural support, thicknesses of the sublayers of the glass composite layer(s) may be, for example, ≥0.0020 inches and ≤0.0040 inches (e.g., 0.0020 inches, 0.0025 inches, 0.0030 inches, 0.0035 inches, or 0.0040 inches). When depended on to provide significant structural support, thicknesses of the glass composite sublayer(s) may be even greater than 0.0040 inches.

As used herein, the term "adjacent" means "near or directly contacting."

Resin of the glass composite layer may directly bond the aluminum layer and the glass composite layer (e.g., aluminum layer 102A and glass composite layer 104A). In such cases, glass composite layer 104A may be adjacent to aluminum layer 102A, and may directly contact aluminum layer 102A.

An additional layer (not shown) may be between aluminum layer 102A and glass composite layer 104A. In such cases, glass composite layer 104A may be adjacent to aluminum layer 102A, but may not directly contact aluminum layer 102A. The additional layer may improve the bonding of aluminum layer 102A and glass composite layer 104A. The additional layer may at least partially decouple effects (e.g., thermal contraction, thermal expansion, strains, or stresses) associated with the bonding of aluminum layer 102A and glass composite layer 104A.

The additional layer may be, for example, an adhesive layer. Care should be taken during selection of material(s) for such an additional layer because, for example, some adhesives comprise silver or other elements or compounds that may interact with aluminum layer 102A and/or glass composite layer 104A via one or more interaction mechanisms (e.g., galvanic corrosion).

As used herein, the term "carbon" means the nonmetallic element of atomic number 6, including any isotopes thereof.

As used herein, the term "carbon composite layer" means a layer comprising a composite that comprises carbon. The carbon may be, for example, in the form of carbon fibers. The carbon fibers in the carbon composite layer may have no specific orientation (e.g., omnidirectional) or may be oriented in one or more directions (e.g., unidirectional, bidirectional, or multidirectional). The carbon fibers may be aligned, continuous, and/or unidirectional.

The carbon fibers may be woven. The strength of the woven fibers may vary with the type of weave and/or the orientation of the woven fibers (e.g., if the woven fibers are oriented in parallel, the strength of the woven fibers as a group should be greater in directions parallel to that orientation). The type of weave may be, for example, a plain weave (e.g., 1×1), a twill weave (e.g., 2×2), a basket weave, a fish weave, a harness weave, a leno weave, a satin weave, or a unidirectional weave.

A carbon composite layer comprises, for example, a matrix. The matrix may comprise, for example, resin. The resin may comprise, for example, a thermoplastic polymer. The thermoplastic polymer may comprise, for example, one or more of PEEK, PEKK, or other thermoplastic polymers. A carbon composite layer may comprise, for example, carbon-fiber-reinforced polymer(s). A carbon composite layer may comprise, for example, carbon-fiber-reinforced thermoplastic polymer(s).

The thermoplastic resin of the one or more carbon-fiber-reinforced thermoplastic prepreg plies provides binding for the carbon fibers. The thermoplastic resin may exhibit a sufficiently high glass transition temperature, continuous service temperature, and/or crystallite melting point so as to allow the aluminum layer(s) (e.g., aluminum layer 102A) to be softened for molding, shaping, and/or other processes associated with manufacture of the stiffening element(s).

The carbon composite layer(s) may be depended on to provide significant structural support. Generally, in such cases, the number and/or thickness of the carbon composite layer(s) are greater than when the carbon composite layer(s) are not depended on to provide significant structural support.

Whether or not depended on to provide significant structural support, thicknesses of the carbon composite layer(s) may be, for example, ≥0.0400 inches and ≤0.1000 inches (e.g., 0.0400 inches, 0.0432 inches, 0.0440 inches, 0.0450 inches, 0.0500 inches, 0.0550 inches, 0.0600 inches, 0.0650 inches, 0.0700 inches, 0.0750 inches, 0.0800 inches, 0.0850 inches, 0.0900 inches, 0.0950 inches, 0.1000 inches). When depended on to provide significant structural support, thicknesses of the carbon composite layer(s) may be even greater than 0.0800 inches.

Whether or not depended on to provide significant structural support, thicknesses of the sublayers of the carbon composite layer(s) may be, for example, ≥0.0040 inches and ≤0.0080 inches (e.g., 0.0040 inches, 0.0044 inches, 0.0045 inches, 0.0050 inches, 0.0054 inches, 0.0055 inches, 0.0060 inches, 0.0065 inches, 0.0070 inches, 0.0075 inches, or 0.0080 inches). When depended on to provide significant structural support, thicknesses of the carbon composite sublayer(s) may be even greater than 0.0080 inches.

The one or more glass-fiber-reinforced thermoplastic prepreg plies may comprise first thermoplastic resin, the one or more carbon-fiber-reinforced thermoplastic prepreg plies may comprise second thermoplastic resin, and the first thermoplastic resin may be the same as the second thermoplastic resin. When the first thermoplastic resin is the same as the second thermoplastic resin, manufacture of the stiffening element(s) may be simplified, and the bonding between the one or more glass-fiber-reinforced thermoplastic prepreg plies and the one or more carbon-fiber-reinforced thermoplastic prepreg plies may be more uniform and/or more stable over time due, for example, to compatibility of the first and second thermoplastic resins.

The one or more glass-fiber-reinforced thermoplastic prepreg plies may comprise first thermoplastic resin, the one or more carbon-fiber-reinforced thermoplastic prepreg plies may comprise second thermoplastic resin, and the first thermoplastic resin may differ from the second thermoplastic resin. When the first thermoplastic resin differs from the second thermoplastic resin, more design options may be available during manufacture of the stiffening element(s), and the bonding between the one or more glass-fiber-reinforced thermoplastic prepreg plies and the one or more carbon-fiber-reinforced thermoplastic prepreg plies may be stronger initially and/or over time, particularly if the first and second thermoplastic resins are selected for mutual chemical compatibility.

The glass composite layer(s) may be configured to prevent interaction (e.g., direct) between the aluminum layer and the carbon composite layer (e.g., glass composite layer 104A may be configured to prevent interaction between aluminum layer 102A and carbon composite layer 106A). The glass composite layer(s) may be configured to prevent galvanic corrosion due to interaction (e.g., direct or indirect) between the aluminum layer and the carbon composite layer (e.g., glass composite layer 104A may be configured to prevent galvanic corrosion due to interaction between aluminum layer 102A and carbon composite layer 106A).

The glass composite layer(s) may be configured to reduce thermal stress, during cooldown (e.g., during a consolidation process), due to differences in thermal contraction between the aluminum layer and the carbon composite layer (e.g., glass composite layer 104A may be configured to reduce thermal stress, during cooldown, due to differences in thermal contraction between aluminum layer 102A and carbon composite layer 106A), for example, by at least partially decoupling the effects of thermal contraction in the aluminum and carbon composite layers and/or through effects associated with orientation of glass fibers in the glass composite layer(s). The glass composite layer(s) may be configured to reduce residual thermal stress, after cooldown (e.g., after a consolidation process), due to differences in thermal contraction, during cooldown, between the aluminum layer and the carbon composite layer (e.g., glass composite layer 104A may be configured to reduce residual thermal stress, after cooldown, due to differences in thermal contraction, during cooldown, between aluminum layer 102A and carbon composite layer 106A), for example, by at least partially decoupling the effects of thermal contraction in the aluminum and carbon composite layers and/or through effects associated with orientation of glass fibers in the glass composite layer(s).

One or more glass composite layers may be configured to reduce thermal stress, both during and after cooldown, functioning as a compliant layer or layers. This compliant functioning helps to avoid separation of adjacent layers due to the build-up of stress near, at, or across boundaries between the adjacent layers.

Resin of the glass composite layer may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

Resin of the carbon composite layer may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

Resins of the glass and carbon composite layers may directly bond the glass composite layer and the carbon composite layer (e.g., glass composite layer 104A and carbon composite layer 106A). In such cases, glass composite layer 104A may be adjacent to carbon composite layer 106A, and may directly contact carbon composite layer 106A.

An additional layer (not shown) may be between glass composite layer 104A and carbon composite layer 106A. In such cases, glass composite layer 104A may be adjacent to carbon composite layer 106A, but may not directly contact carbon composite layer 106A. The additional layer may improve the bonding of glass composite layer 104A and carbon composite layer 106A. The additional layer may at least partially decouple effects (e.g., thermal contraction, thermal expansion, strains, or stresses) associated with the bonding of glass composite layer 104A and carbon composite layer 106A.

The additional layer may be, for example, an adhesive layer. Care should be taken during selection of material(s) for such an additional layer because, for example, some adhesives comprise elements or compounds that may interact with glass composite layer 104A and/or carbon composite layer 106A via one or more interaction mechanisms.

One or more layers may be between a given aluminum layer and a given carbon composite layer. The one or more layers may comprise, for example, glass composite layer(s) and/or adhesive layer(s). The one or more layers may be configured to prevent interaction (e.g., direct) between the aluminum layer(s) and the carbon composite layer(s) (e.g., configured to prevent interaction between aluminum layer 102A and carbon composite layer 106A). The one or more layers may be configured to prevent galvanic corrosion due to interaction (e.g., direct or indirect) between the aluminum layer(s) and the carbon composite layer(s) (e.g., configured to prevent galvanic corrosion due to interaction between aluminum layer 102A and carbon composite layer 106A).

Figure 1B:
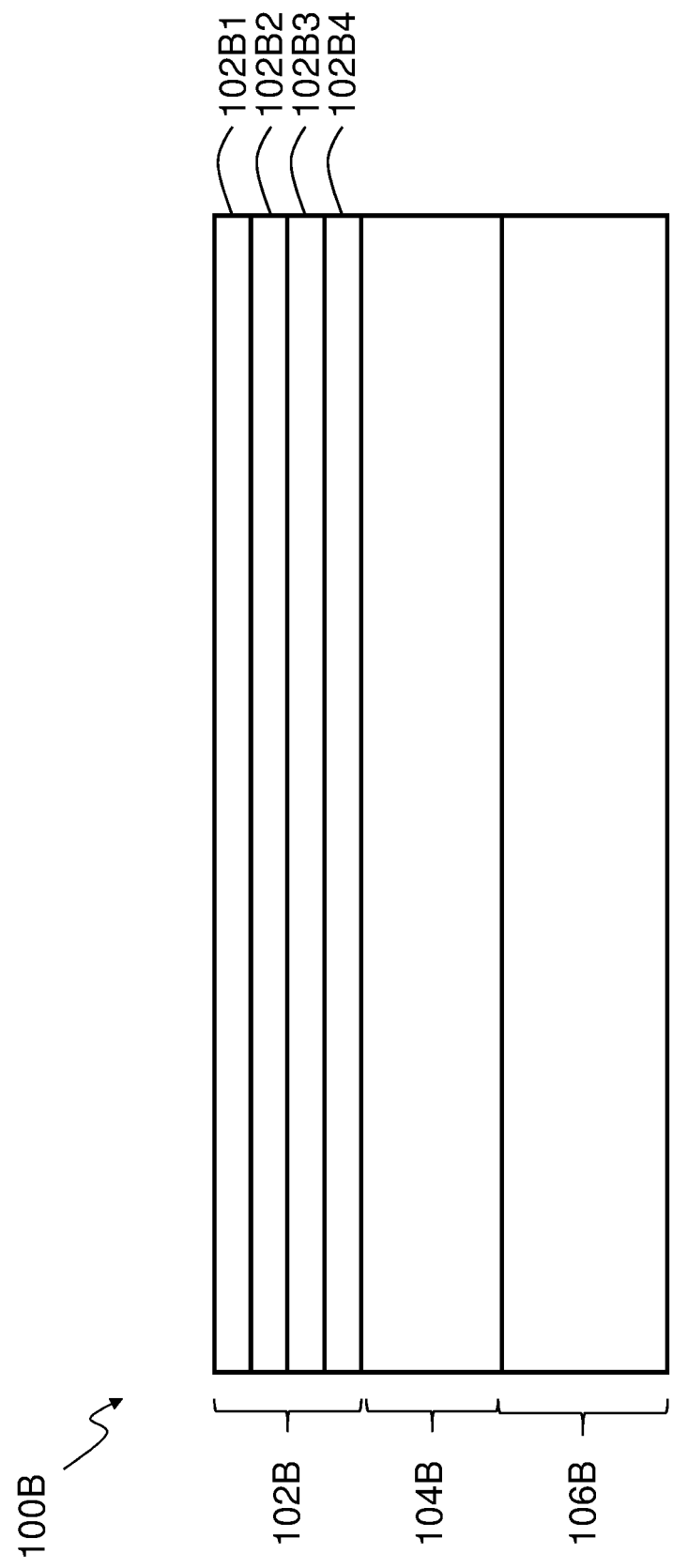
FIG. 1B shows a stiffening element, according to some examples of the disclosed stiffening elements.

FIG. 1B shows stiffening element 100B, according to some examples of the disclosed stiffening elements. As shown in FIG. 1B, stiffening element 100B comprises: aluminum layer 102B; glass composite layer 104B adjacent to aluminum layer 102B; and carbon composite layer 106B adjacent to glass composite layer 104B, and opposite to aluminum layer 102B.

Glass composite layer 104B may comprise one or more glass-fiber-reinforced thermoplastic prepreg plies. Carbon composite layer 106B may comprise one or more carbon-fiber-reinforced thermoplastic prepreg plies.

Aluminum layer 102B may comprise a plurality of aluminum sublayers 102B1, 102B2, 102B3, 102B4 (e.g., 102B1, 102B2, . . . , 102Bn). The number (n) of aluminum sublayers may be, for example, 2, 3, 4, 5, 6, or more sublayers.

Aluminum layer 102B, glass composite layer 104B, and carbon composite layer 106B may have the same or different thicknesses. Similarly, plurality of aluminum sublayers 102B1, 102B2, 102B3, 102B4 may have the same or different thicknesses.

Aluminum layer 102B (e.g., aluminum sublayer 102B1) may be configured to form the outer surface of stiffening element 100B or an outer surface of stiffening element 100B.

Stiffening element 100B may comprise one or more integral current flowpaths. Aluminum layer 102B (e.g., one or more of aluminum sublayers 102B1, 102B2, 102B3, or 102B4) may be configured to form at least part of the one or more integral current flowpaths.

Figure 1C:
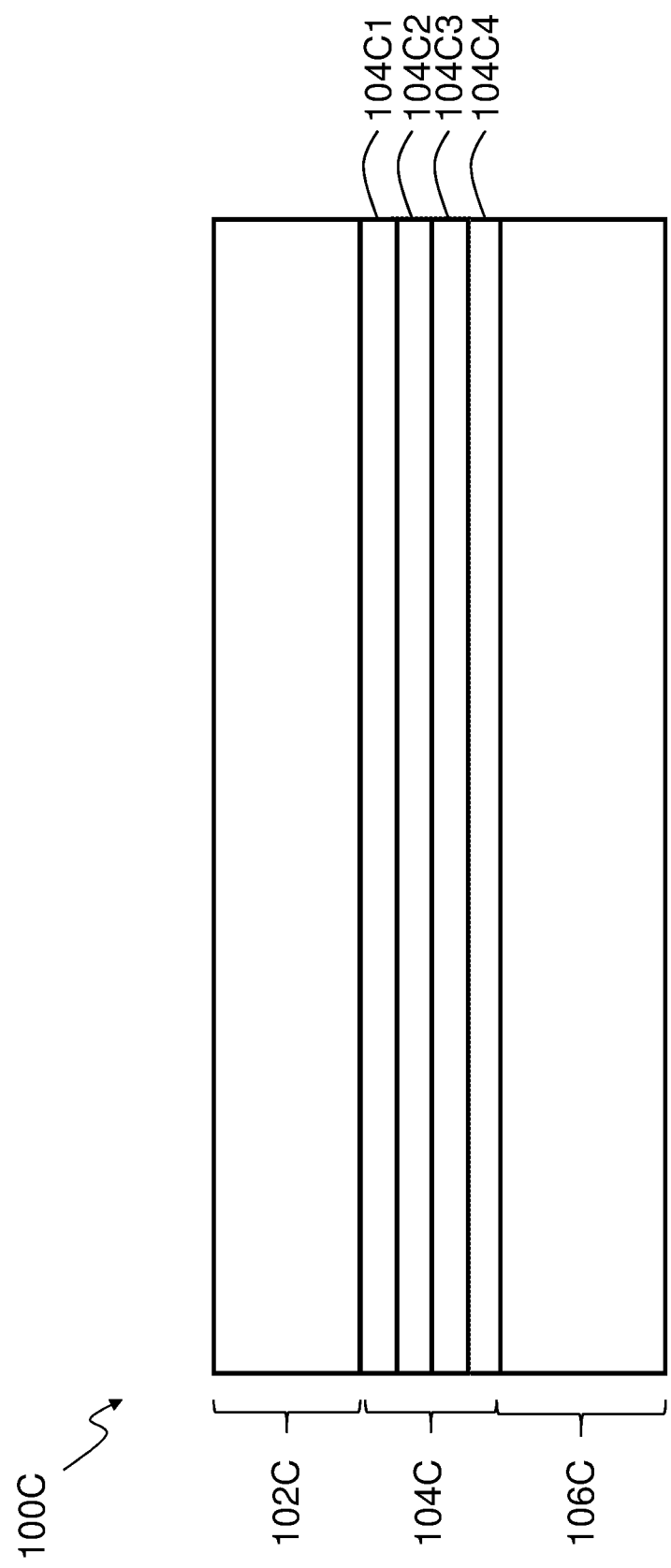
FIG. 1C shows a stiffening element, according to some examples of the disclosed stiffening elements.

FIG. 1C shows stiffening element 100C, according to some examples of the disclosed stiffening elements. As shown in FIG. 1C, stiffening element 100C comprises: aluminum layer 102C; glass composite layer 104C adjacent to aluminum layer 102C; and carbon composite layer 106C adjacent to glass composite layer 104C, and opposite to aluminum layer 102C.

Glass composite layer 104C may comprise one or more glass-fiber-reinforced thermoplastic prepreg plies. Carbon composite layer 106C may comprise one or more carbon-fiber-reinforced thermoplastic prepreg plies.

Glass composite layer 104C may comprise a plurality of glass composite sublayers 104C1, 104C2, 104C3, 104C4 (e.g., 104C1, 104C2, . . . , 104Cn). The number (n) of glass composite sublayers may be, for example, 2, 3, 4, 5, 6, 7, 8, 9, 10, 11, 12, or more sublayers.

Aluminum layer 102C, glass composite layer 104C, and carbon composite layer 106C may have the same or different thicknesses. Similarly, plurality of glass composite sublayers 104C1, 104C2, 104C3, 104C4 may have the same or different thicknesses.

Aluminum layer 102C may be configured to form the outer surface of stiffening element 100C or an outer surface of stiffening element 100C.

Stiffening element 100C may comprise one or more integral current flowpaths. Aluminum layer 102C may be configured to form at least part of the one or more integral current flowpaths.

FIG. 1D shows stiffening element 100D, according to some examples of the disclosed stiffening elements. As shown in FIG. 1D, stiffening element 100D comprises: aluminum layer 102D; glass composite layer 104D adjacent to aluminum layer 102D; and carbon composite layer 106D adjacent to glass composite layer 104D, and opposite to aluminum layer 102D.

Glass composite layer 104D may comprise one or more glass-fiber-reinforced thermoplastic prepreg plies. Carbon composite layer 106D may comprise one or more carbon-fiber-reinforced thermoplastic prepreg plies.

Carbon composite layer 106D may comprise a plurality of carbon composite sublayers 106D1, 106D2, 106D3, 106D4 (e.g., 106D1, 106D2, . . . , 106Dn). The number (n) of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Aluminum layer 102D, glass composite layer 104D, and carbon composite layer 106D may have the same or different thicknesses. Similarly, plurality of carbon composite sublayers 106D1, 106D2, 106D3, 106D4 may have the same or different thicknesses.

Aluminum layer 102D may be configured to form the outer surface of stiffening element 100D or an outer surface of stiffening element 100D.

Stiffening element 100D may comprise one or more integral current flowpaths. Aluminum layer 102D may be configured to form at least part of the one or more integral current flowpaths.

FIG. 1E shows stiffening element 100E, according to some examples of the disclosed stiffening elements. As shown in FIG. 1E, stiffening element 100E comprises: aluminum layer 102E; glass composite layer 104E adjacent to aluminum layer 102E; and carbon composite layer 106E adjacent to glass composite layer 104E, and opposite to aluminum layer 102E.

Glass composite layer 104E may comprise one or more glass-fiber-reinforced thermoplastic prepreg plies. Carbon composite layer 106E may comprise one or more carbon-fiber-reinforced thermoplastic prepreg plies.

Aluminum layer 102E may comprise a plurality of aluminum sublayers 102E1, 102E2 (e.g., 102E1, 102E2, ..., 102En). The number (n) of aluminum sublayers may be, for example, 2, 3, 4, 5, 6, or more sublayers. Glass composite layer 104E may comprise a plurality of glass composite sublayers 104E1, 104E2, 104E3, 104E4 (e.g., 104E1, 104E2, ..., 104Eo). The number (o) of glass composite sublayers may be, for example, 2, 3, 4, 5, 6, 7, 8, 9, 10, 11, 12, or more sublayers. Carbon composite layer 106E may comprise a plurality of carbon composite sublayers 106E1, 106E2, 106E3 (e.g., 106E1, 106E2, ..., 106Ep). The number (p) of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

The number of aluminum sublayers may be the same as or differ from the number of glass composite sublayers. The number of aluminum sublayers may be the same as or differ from the number of carbon composite sublayers. The number of glass composite sublayers may be the same as or differ from the number of carbon composite sublayers.

Aluminum layer 102E, glass composite layer 104E, and carbon composite layer 106E may have the same or different thicknesses. Plurality of plurality of aluminum sublayers 102E1, 102E2 may have the same or different thicknesses. Plurality of glass composite sublayers 104E1, 104E2, 104E3, 104E4 may have the same or different thicknesses. Plurality of carbon composite sublayers 106E1, 106E2, 106E3 may have the same or different thicknesses.

Aluminum layer 102E (e.g., aluminum sublayer 102E1) may be configured to form the outer surface of stiffening element 100E or an outer surface of stiffening element 100E.

Stiffening element 100E may comprise one or more integral current flowpaths. Aluminum layer 102E (e.g., one or both of aluminum sublayers 102E1 or 102E2) may be configured to form at least part of the one or more integral current flowpaths.

The glass composite layer (e.g., glass composite layer 104A, 104B, 104C, 104D, 104E) may comprise first thermoplastic resin. The first thermoplastic resin may comprise PEEK. The first thermoplastic resin may comprise PEKK. the first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The carbon composite layer (e.g., carbon composite layer 106A, 106B, 106C, 106D, 106E) may comprise second thermoplastic resin. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The first thermoplastic resin may be the same as the second thermoplastic resin. The first thermoplastic resin may differ from the second thermoplastic resin.

Figure 2A:
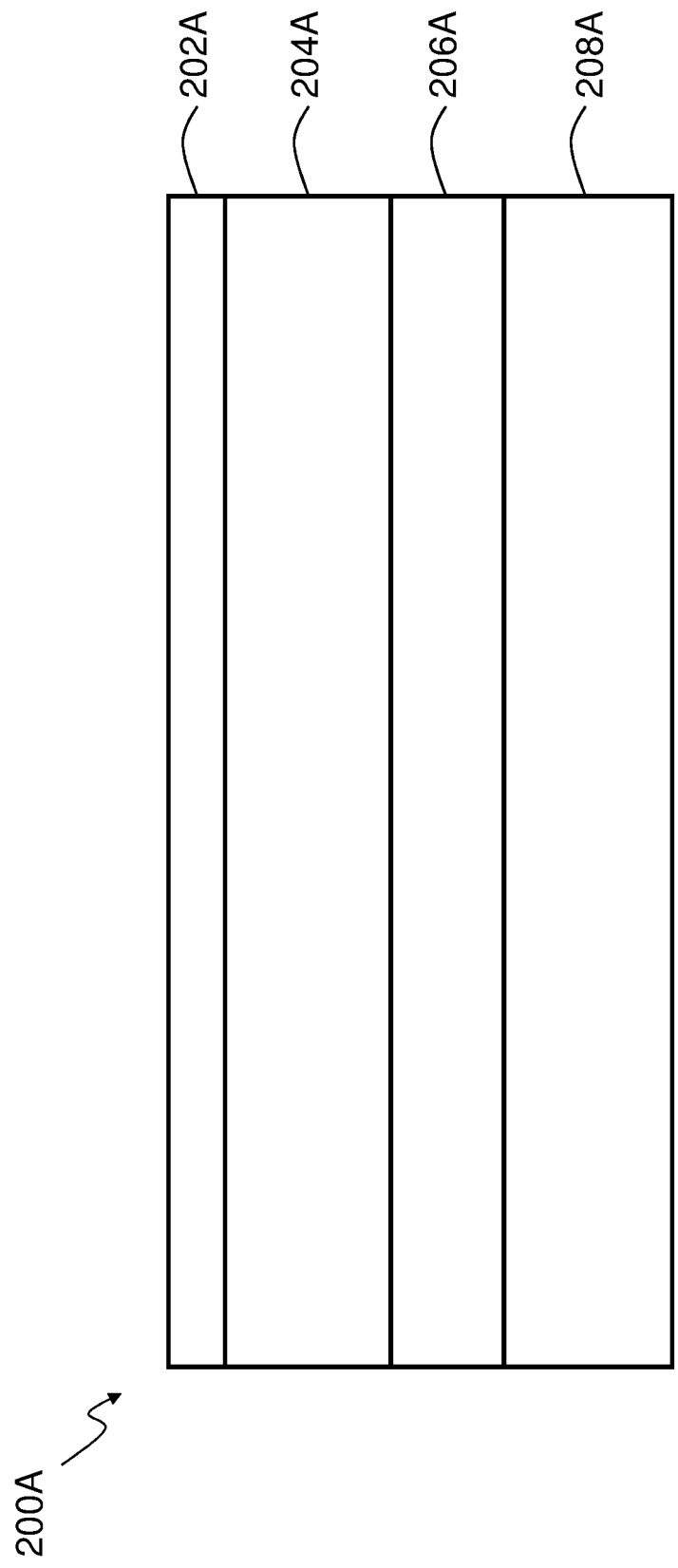
FIG. 2A shows a stiffening element, according to some examples of the disclosed stiffening elements.

FIG. 2A shows stiffening element 200A, according to some examples of the disclosed stiffening elements. As shown in FIG. 2A, stiffening element 200A comprises: first aluminum layer 202A; first glass composite layer 204A adjacent to first aluminum layer 202A; first carbon composite layer 206A adjacent to first glass composite layer 204A, and opposite to first aluminum layer 202A; and second glass composite layer 208A adjacent to first carbon composite layer 206A, and opposite to first glass composite layer 204A.

First aluminum layer 202A may be configured to form the outer surface of stiffening element 200A or an outer surface of stiffening element 200A.

Stiffening element 200A may comprise one or more integral current flowpaths. Aluminum layer 202A may be configured to form at least part of the one or more integral current flowpaths.

First aluminum layer 202A may comprise a plurality of first aluminum sublayers (not shown). The number of first aluminum sublayers may be, for example, 2, 3, 4, 5, 6, or more sublayers. First glass composite layer 204A may comprise a plurality of first glass composite sublayers (not shown). The number of first glass composite sublayers may be, for example, 2, 3, 4, 5, 6, 7, 8, 9, 10, 11, 12, or more sublayers. Each or all of the first glass composite sublayers may comprise one or more glass-fiber-reinforced thermoplastic prepreg plies. First carbon composite layer 206A may comprise a plurality of first carbon composite sublayers (not shown). The number of first carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers). Each or all of the first carbon composite sublayers may comprise one or more carbon-fiber-reinforced thermoplastic prepreg plies.

Second glass composite layer 208A may comprise a plurality of second glass composite sublayers (not shown). The number of second glass composite sublayers may be, for example, 2, 3, 4, 5, 6, 7, 8, 9, 10, 11, 12, or more sublayers. Each or all of the sublayers may comprise one or more glass-fiber-reinforced thermoplastic prepreg plies.

First glass composite layer 204A may comprise one or more first glass-fiber-reinforced thermoplastic prepreg plies which, in turn, may comprise first thermoplastic resin. First carbon composite layer 206A may comprise one or more first carbon-fiber-reinforced thermoplastic prepreg plies which, in turn, may comprise second thermoplastic resin. Second glass composite layer 208A may comprise one or more second glass-fiber-reinforced thermoplastic prepreg plies which, in turn, may comprise third thermoplastic resin. The first thermoplastic resin may be the same as or differ from the second thermoplastic resin. The first thermoplastic resin may be the same as or differ from the third thermoplastic resin. The second thermoplastic resin may be the same as or differ from the third thermoplastic resin.

The first thermoplastic resin may comprise PEEK. The first thermoplastic resin may comprise PEKK. The first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The third thermoplastic resin may comprise PEEK. The third thermoplastic resin may comprise PEKK. The third thermoplastic resin may comprise one or more of PAEK, PEI, or PPS. The third thermoplastic resin may comprise, for example, one or more of PAEK, PEEK, PEEKK, PEI, PEK, PEKEKK, PEKK, or PPS.

Figure 2B:
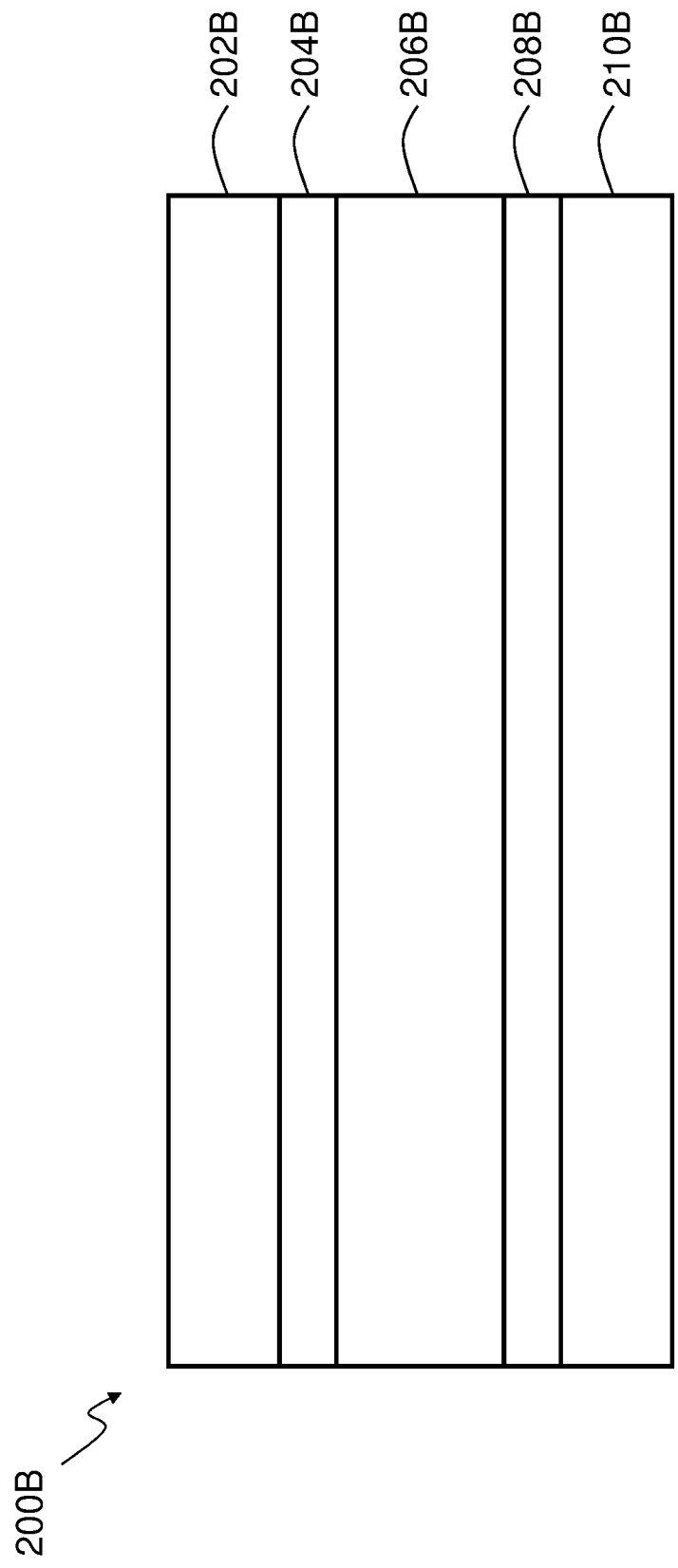
FIG. 2B shows a stiffening element, according to some examples of the disclosed stiffening elements.

FIG. 2B shows stiffening element 200B, according to some examples of the disclosed stiffening elements. As shown in FIG. 2B, stiffening element 200B comprises: first aluminum layer 202B; first glass composite layer 204B adjacent to first aluminum layer 202B; first carbon composite layer 206B adjacent to first glass composite layer 204B, and opposite to first aluminum layer 202B; second glass composite layer 208B adjacent to first carbon composite layer 206B, and opposite to first glass composite layer 204B; and second aluminum layer 210B adjacent to second glass composite layer 208B, and opposite to first carbon composite layer 206B.

First glass composite layer 204B may comprise one or more glass-fiber-reinforced thermoplastic prepreg plies. First carbon composite layer 206B may comprise one or more carbon-fiber-reinforced thermoplastic prepreg plies. Second glass composite layer 208B may comprise one or more glass-fiber-reinforced thermoplastic prepreg plies.

First aluminum layer 202B may be configured to form the outer surface of stiffening element 200B or an outer surface of stiffening element 200B. Second aluminum layer 210B may be configured to form the outer surface of stiffening element 200B or an outer surface of stiffening element 200B. First aluminum layer 202B may be configured to form a first outer surface of stiffening element 200B, while second aluminum layer 210B may be configured to form a second outer surface of stiffening element 200B. The first outer surface of stiffening element 200B may be substantially parallel to the second outer surface of stiffening element 200B.

Stiffening element 200B may comprise one or more integral current flowpaths. First aluminum layer 202B may be configured to form at least part of the one or more integral current flowpaths. Second aluminum layer 210B may be configured to form at least part of the one or more integral current flowpaths.

First aluminum layer 202B may be configured to form a first flowpath of the one or more integral current flowpaths. Second aluminum layer 210B may be configured to form a second flowpath of the one or more integral current flowpaths. The first flowpath may differ from the second flowpath (e.g., independent from each other). The first and second flowpaths may be part of a same integral current flowpath.

Current flow in the first flowpath may be substantially parallel to current flow in the second flowpath. Current flow in the first flowpath may be substantially in a same direction as current flow in the second flowpath. Current flow in the first flowpath may be substantially in an opposite direction from current flow in the second flowpath. Current flow in the first flowpath may be substantially parallel to and in a same direction as current flow in the second flowpath. Current flow in the first flowpath may be substantially parallel to but in an opposite direction from current flow in the second flowpath.

First aluminum layer 202B may comprise a plurality of first aluminum sublayers (not shown). The number of first aluminum sublayers may be, for example, 2, 3, 4, 5, 6, or more sublayers. First glass composite layer 204B may comprise a plurality of first glass composite sublayers (not shown). The number of first glass composite sublayers may be, for example, 2, 3, 4, 5, 6, 7, 8, 9, 10, 11, 12, or more sublayers. Each or all of the first glass composite sublayers may comprise one or more glass-fiber-reinforced thermoplastic prepreg plies. First carbon composite layer 206B may comprise a plurality of first carbon composite sublayers (not shown). The number of first carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers). Each or all of the first carbon composite sublayers may comprise one or more carbon-fiber-reinforced thermoplastic prepreg plies.

Second aluminum layer 210B may comprise a plurality of second aluminum sublayers (not shown). The number of second aluminum sublayers may be, for example, 2, 3, 4, 5, 6, or more sublayers.

First aluminum layer 202B and second aluminum layer 210B may comprise the same aluminum alloy. First aluminum layer 202B and second aluminum layer 210B may comprise different aluminum alloys.

Figure 2C:
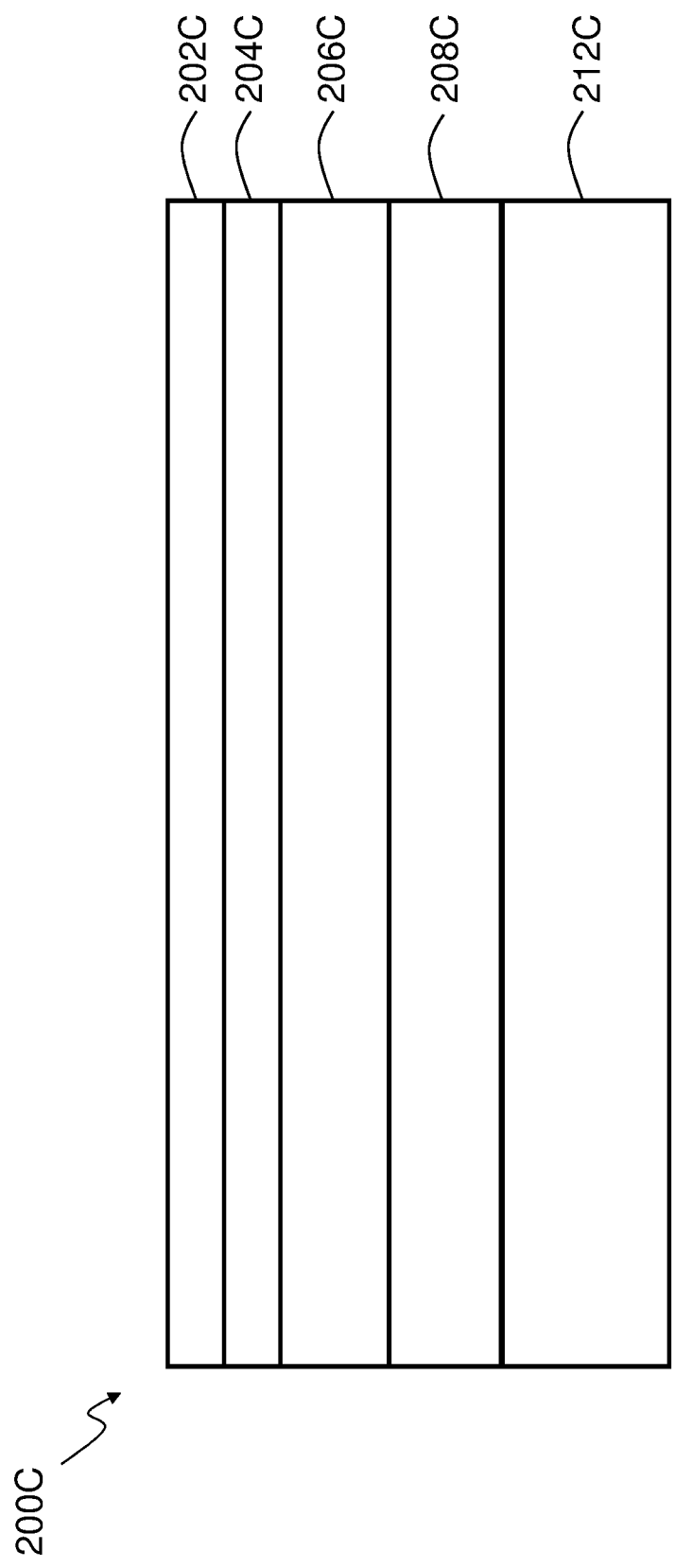
FIG. 2C shows a stiffening element, according to some examples of the disclosed stiffening elements.

FIG. 2C shows stiffening element 200C, according to some examples of the disclosed stiffening elements. As shown in FIG. 2C, stiffening element 200C comprises: first aluminum layer 202C; first glass composite layer 204C adjacent to first aluminum layer 202C; first carbon composite layer 206C adjacent to first glass composite layer 204C, and opposite to first aluminum layer 202C; second glass composite layer 208C adjacent to first carbon composite layer 206C, and opposite to first glass composite layer 204C; and second carbon composite layer 212C adjacent to second glass composite layer 208C, and opposite to first carbon composite layer 206C.

First aluminum layer 202C may comprise a plurality of first aluminum sublayers (not shown). The number of first aluminum sublayers may be, for example, 2, 3, 4, 5, 6, or more sublayers. First glass composite layer 204C may comprise a plurality of first glass composite sublayers (not shown). The number of first glass composite sublayers may be, for example, 2, 3, 4, 5, 6, 7, 8, 9, 10, 11, 12, or more sublayers. Each or all of the first glass composite sublayers may comprise one or more glass-fiber-reinforced thermoplastic prepreg plies. First carbon composite layer 206C may comprise a plurality of first carbon composite sublayers (not shown). The number of first carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers). Each or all of the first carbon composite sublayers may comprise one or more carbon-fiber-reinforced thermoplastic prepreg plies.

Second carbon composite layer 212C may comprise a plurality of second carbon composite sublayers (not shown). The number of second carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Each or all of the sublayers may comprise one or more carbon-fiber-reinforced thermoplastic prepreg plies.

First glass composite layer 204C may comprise one or more first glass-fiber-reinforced thermoplastic prepreg plies which, in turn, may comprise first thermoplastic resin. First carbon composite layer 206C may comprise one or more first carbon-fiber-reinforced thermoplastic prepreg plies which, in turn, may comprise second thermoplastic resin. Second glass composite layer 208C may comprise one or more second glass-fiber-reinforced thermoplastic prepreg plies which, in turn, may comprise third thermoplastic resin. Second carbon composite layer 212C may comprise one or more second carbon-fiber-reinforced thermoplastic prepreg plies which, in turn, may comprise fourth thermoplastic resin. The first thermoplastic resin may be the same as or differ from the second thermoplastic resin. The first thermoplastic resin may be the same as or differ from the third thermoplastic resin. The first thermoplastic resin may be the same as or differ from the fourth thermoplastic resin. The second thermoplastic resin may be the same as or differ from the third thermoplastic resin. The second thermoplastic resin may be the same as or differ from the fourth thermoplastic resin. The third thermoplastic resin may be the same as or differ from the fourth thermoplastic resin.

The first thermoplastic resin may comprise PEEK. The first thermoplastic resin may comprise PEKK. The first thermoplastic resin may comprise one or more of PAEK, PEI, or PPS. The first thermoplastic resin may comprise, for example, one or more of PAEK, PEEK, PEEKK, PEI, PEK, PEKEKK, PEKK, or PPS. The second thermoplastic resin may comprise PEEK. The second thermoplastic resin may comprise PEKK. The second thermoplastic resin may comprise one or more of PAEK, PEI, or PPS. The second thermoplastic resin may comprise, for example, one or more of PAEK, PEEK, PEEKK, PEI, PEK, PEKEKK, PEKK, or PPS. The third thermoplastic resin may comprise PEEK. The third thermoplastic resin may comprise PEKK. The third thermoplastic resin may comprise one or more of PAEK, PEI, or PPS. The third thermoplastic resin may comprise, for example, one or more of PAEK, PEEK, PEEKK, PEI, PEK, PEKEKK, PEKK, or PPS. The fourth thermoplastic resin may comprise PEEK. The fourth thermoplastic resin may comprise PEKK. The fourth thermoplastic resin may comprise one or more of PAEK, PEI, or PPS. The fourth thermoplastic resin may comprise, for example, one or more of PAEK, PEEK, PEEKK, PEI, PEK, PEKEKK, PEKK, or PPS.

Figure 2D:
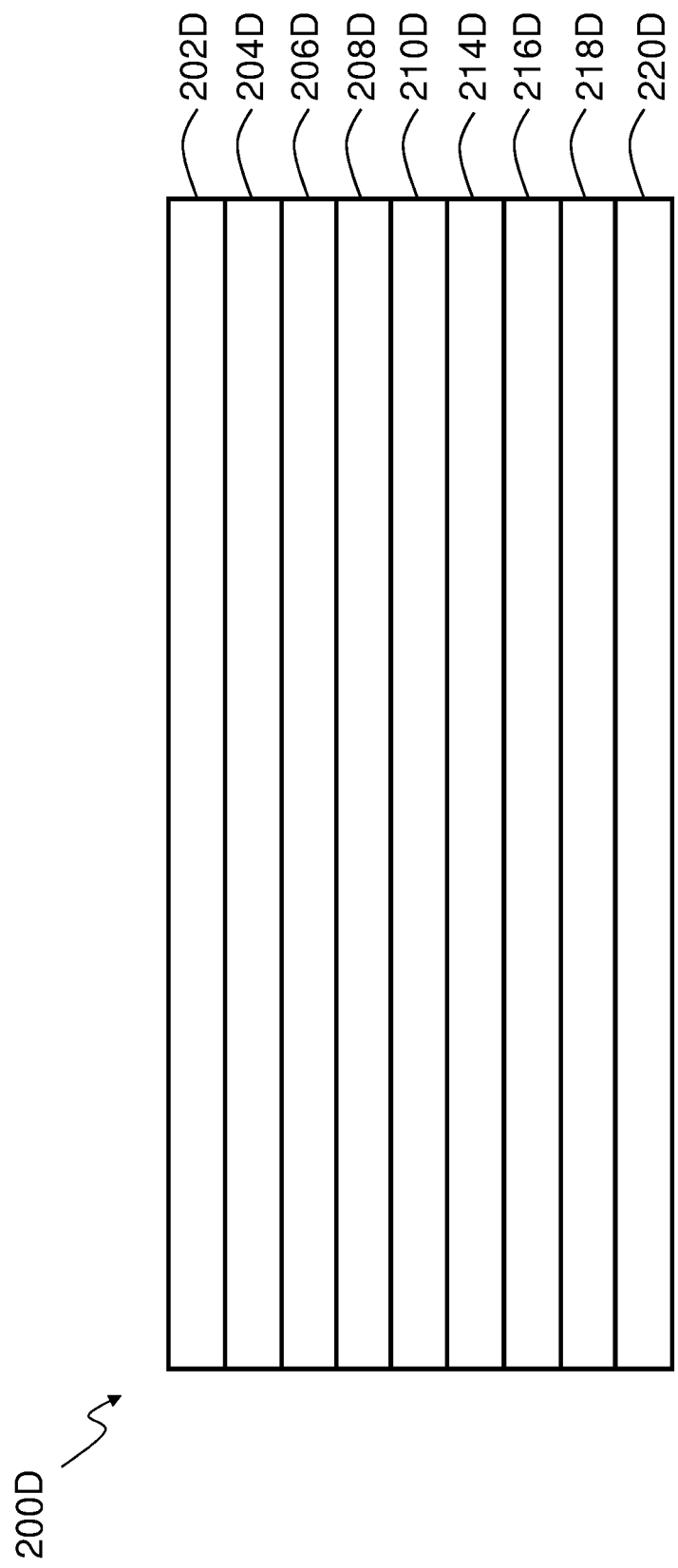
FIG. 2D shows a stiffening element, according to some examples of the disclosed stiffening elements.

FIG. 2D shows stiffening element 200D, according to some examples of the disclosed stiffening elements. As shown in FIG. 2D, stiffening element 200D may comprise: first aluminum layer 202D; first glass composite layer 204D adjacent to first aluminum layer 202D; first carbon composite layer 206D adjacent to first glass composite layer 204D, and opposite to first aluminum layer 202D; second glass composite layer 208D adjacent to first carbon composite layer 206D, and opposite to first glass composite layer 204D; second aluminum layer 210D adjacent to second glass composite layer 208D, and opposite to first carbon composite layer 206D; third glass composite layer 214D adjacent to second aluminum layer 210D, and opposite to second glass composite layer 208D; second carbon composite layer 216D adjacent to third glass composite layer 214D, and opposite to second aluminum layer 210D; fourth glass composite layer 218D adjacent to second carbon composite layer 216D, and opposite to third glass composite layer 214D; and third aluminum layer 220D adjacent to fourth glass composite layer 218D, and opposite to second carbon composite layer 216D.

Each of the aluminum layers may comprise a plurality of aluminum sublayers (not shown). The number of aluminum sublayers may be, for example, 2, 3, 4, 5, 6, or more sublayers. Each of the glass composite layers may comprise a plurality of glass composite sublayers (not shown). The number of glass composite sublayers may be, for example, 2, 3, 4, 5, 6, 7, 8, 9, 10, 11, 12, or more sublayers. Each of the carbon composite layers may comprise a plurality of carbon composite sublayers (not shown). The number of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

First aluminum layer 202D may be configured to form the outer surface of stiffening element 200D or an outer surface of stiffening element 200D. Third aluminum layer 220D may be configured to form the outer surface of stiffening element 200D or an outer surface of stiffening element 200D. First aluminum layer 202D may be configured to form a first outer surface of stiffening element 200D, while third aluminum layer 220D may be configured to form a second outer surface of stiffening element 200D. The first outer surface of stiffening element 200D may be substantially parallel to the second outer surface of stiffening element 200D.

Stiffening element 200D may comprise one or more integral current flowpaths. First aluminum layer 202D may be configured to form at least part of the one or more integral current flowpaths. Second aluminum layer 210D may be configured to form at least part of the one or more integral current flowpaths. Third aluminum layer 220D may be configured to form at least part of the one or more integral current flowpaths.

First aluminum layer 202D may be configured to form a first flowpath of the one or more integral current flowpaths. Third aluminum layer 220D may be configured to form a second flowpath of the one or more integral current flowpaths. The first flowpath may differ from the second flowpath (e.g., independent from each other). The first and second flowpaths may be part of a same integral current flowpath.

Current flow in the first flowpath may be substantially parallel to current flow in the second flowpath. Current flow in the first flowpath may be substantially in a same direction as current flow in the second flowpath. Current flow in the first flowpath may be substantially in an opposite direction from current flow in the second flowpath. Current flow in the first flowpath may be substantially parallel to and in a same direction as current flow in the second flowpath. Current flow in the first flowpath may be substantially parallel to but in an opposite direction from current flow in the second flowpath.

First aluminum layer 202D may be configured to form a first flowpath of the one or more integral current flowpaths. Second aluminum layer 210D may be configured to form a second flowpath of the one or more integral current flowpaths. Third aluminum layer 220D may be configured to form a third flowpath of the one or more integral current flowpaths. The first flowpath may differ from the second flowpath (e.g., independent from each other), the first flowpath may differ from the third flowpath (e.g., independent from each other), and second flowpath may differ from the third flowpath (e.g., independent from each other).

Current flow in any of the first, second, or third flowpaths may be substantially parallel to current flow in either of the other two flowpaths. Current flow in any of the first, second, or third flowpaths may be substantially in a same direction as current flow in either of the other two flowpaths. Current flow in any of the first, second, or third flowpaths may be substantially in an opposite direction from current flow in either of the other two flowpaths. Current flow in any of the first, second, or third flowpaths may be substantially parallel to and in a same direction as current flow in in either of the other two flowpaths. Current flow in any of the first, second, or third flowpaths may be substantially parallel to but in an opposite direction from current flow in either of the other two flowpaths.

First aluminum layer 202D and second aluminum layer 210D may comprise the same aluminum alloy. First aluminum layer 202D and third aluminum layer 220D may comprise the same aluminum alloy. Second aluminum layer 210D and third aluminum layer 220D may comprise the same aluminum alloy. First aluminum layer 202D, second aluminum layer 210D, and third aluminum layer 220D may comprise the same aluminum alloy.

First aluminum layer 202D and second aluminum layer 210D may comprise different aluminum alloys. First aluminum layer 202D and third aluminum layer 220D may comprise different aluminum alloys. Second aluminum layer 210D and third aluminum layer 220D may comprise different aluminum alloys. First aluminum layer 202D, second aluminum layer 210D, and third aluminum layer 220D each may comprise different aluminum alloys.

Each or all of the glass composite layers may comprise one or more glass-fiber-reinforced thermoplastic prepreg plies which, in turn, may comprise first thermoplastic resin. The first thermoplastic resin may comprise PEEK. The first thermoplastic resin may comprise PEKK. The first thermoplastic resin may comprise one or more of PAEK, PEI, or PPS. The first thermoplastic resin may comprise one or more of PAEK, PEEK, PEEKK, PEI, PEK, PEKEKK, PEKK, or PPS. The first thermoplastic resin may be the same as or differ from the thermoplastic resin in any other glass or carbon composite layer(s).

Each or all of the carbon composite layers may comprise one or more carbon-fiber-reinforced thermoplastic prepreg plies which, in turn, may comprise second thermoplastic resin. In each or all of the carbon composite layers, the second thermoplastic resin may comprise PEEK. In each or all of the carbon composite layers, the second thermoplastic resin may comprise PEKK. In each or all of the carbon composite layers, the second thermoplastic resin may comprise one or more of PAEK, PEI, or PPS. In each or all of the carbon composite layers, the second thermoplastic resin may comprise one or more of PAEK, PEEK, PEEKK, PEI, PEK, PEKEKK, PEKK, or PPS. In each of the carbon composite layers, the second thermoplastic resin may be the same as or differ from the thermoplastic resin in any other carbon or glass composite layer(s).

Figure 2E:
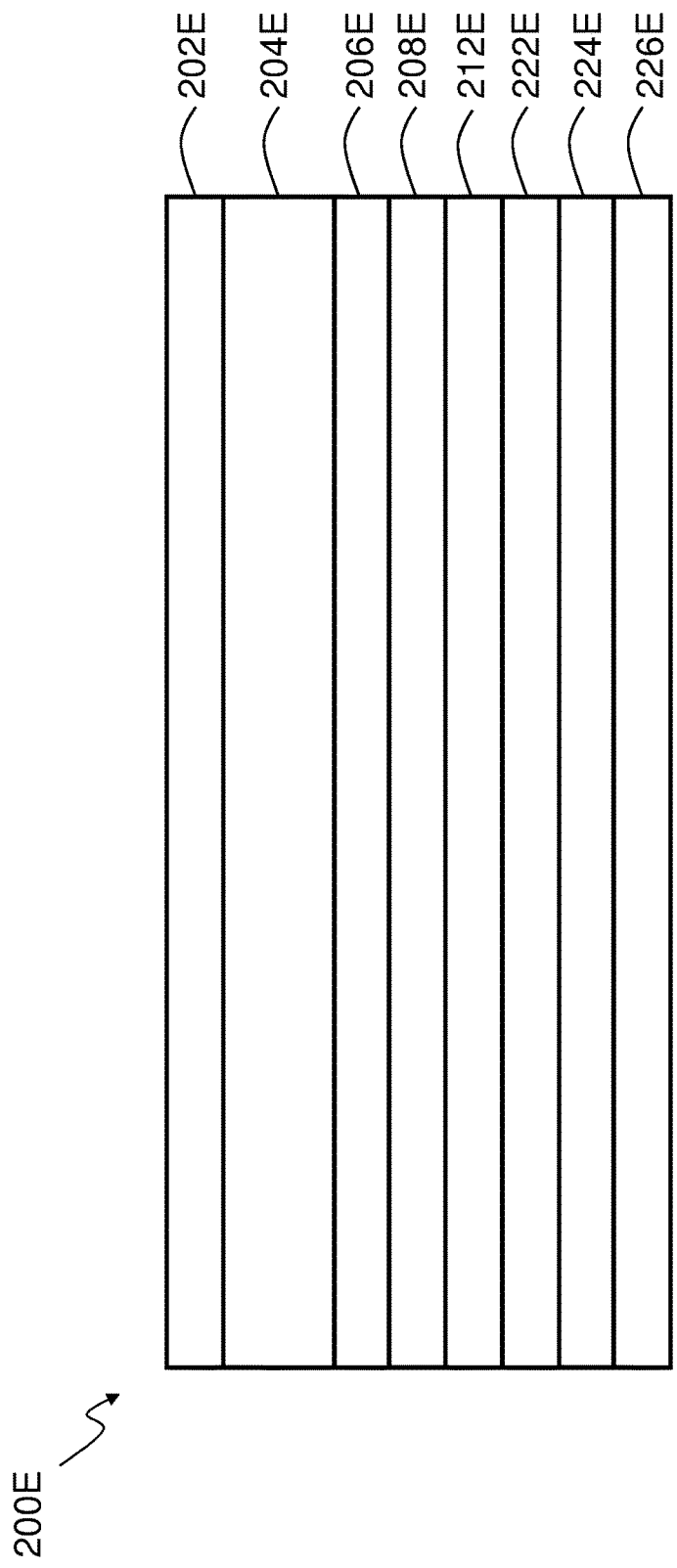
FIG. 2E shows a stiffening element, according to some examples of the disclosed stiffening elements.

FIG. 2E shows stiffening element 200E, according to some examples of the disclosed stiffening elements. As shown in FIG. 2E, stiffening element 200E may comprise: first aluminum layer 202E; first glass composite layer 204E adjacent to first aluminum layer 202E; first carbon composite layer 206E adjacent to first glass composite layer 204E, and opposite to first aluminum layer 202E; second glass composite layer 208E adjacent to first carbon composite layer 206E, and opposite to first glass composite layer 204E; second carbon composite layer 212E adjacent to second glass composite layer 208E, and opposite to first carbon composite layer 206E; third glass composite layer 222E adjacent to second carbon composite layer 212E, and opposite to second glass composite layer 208E; third carbon composite layer 224E adjacent to third glass composite layer 222E, and opposite to second carbon composite layer 212E; and/or fourth glass composite layer 226E adjacent to third carbon composite layer 224E, and opposite to third glass composite layer 222E.

First aluminum layer 202E may comprise a plurality of first aluminum sublayers (not shown). The number of first aluminum sublayers may be, for example, 2, 3, 4, 5, 6, or more sublayers. Each of the glass composite layers may comprise a plurality of glass composite sublayers (not shown). The number of glass composite sublayers may be, for example, 2, 3, 4, 5, 6, 7, 8, 9, 10, 11, 12, or more sublayers. Each of the carbon composite layers may comprise a plurality of carbon composite sublayers (not shown). The number of carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Each or all of the glass composite layers may comprise one or more glass-fiber-reinforced thermoplastic prepreg plies which, in turn, may comprise first thermoplastic resin. In each or all of the glass composite layers, the first thermoplastic resin may comprise PEEK. In each or all of the glass composite layers, the first thermoplastic resin may comprise PEKK. In each or all of the glass composite layers, the first thermoplastic resin may comprise one or more of PAEK, PEI, or PPS. In each or all of the glass composite layers, the first thermoplastic resin may comprise one or more of PAEK, PEEK, PEEKK, PEI, PEK, PEKEKK, PEKK, or PPS. In each of the glass composite layers, the first thermoplastic resin may be the same as or differ from the thermoplastic resin in any other glass or carbon composite layer(s).

Each or all of the carbon composite layers may comprise one or more carbon-fiber-reinforced thermoplastic prepreg plies which, in turn, may comprise second thermoplastic resin. In each or all of the carbon composite layers, the second thermoplastic resin may comprise PEEK. In each or all of the carbon composite layers, the second thermoplastic resin may comprise PEKK. In each or all of the carbon composite layers, the second thermoplastic resin may comprise one or more of PAEK, PEI, or PPS. In each or all of the carbon composite layers, the second thermoplastic resin may comprise one or more of PAEK, PEEK, PEEKK, PEI, PEK, PEKEKK, PEKK, or PPS. In each of the carbon composite layers, the second thermoplastic resin may be the same as or differ from the thermoplastic resin in any other carbon or glass composite layer(s).

Figure 3A:
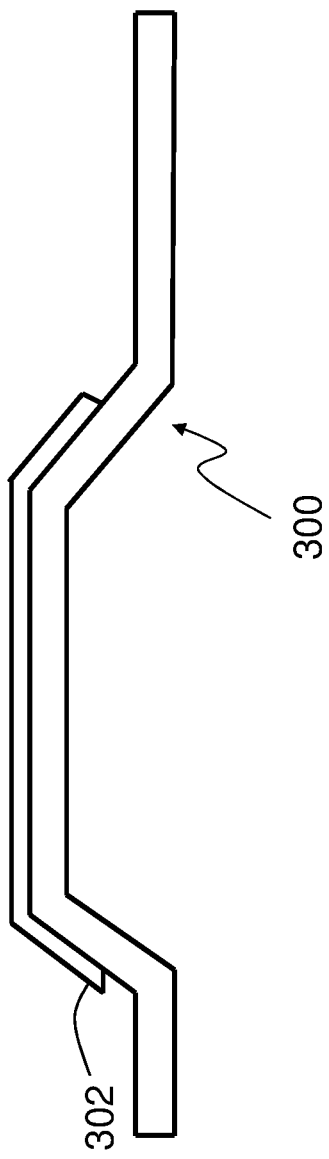
FIG. 3A shows laying up a first layer on a mold tool, according to some examples of the disclosed stiffening elements.

FIG. 3A shows laying up a first layer on a mold tool (e.g., a mandrel), according to some examples of the disclosed stiffening elements. As shown in FIG. 3A, first layer 302 may be laid up on mold tool 300. Mold tool 300 may be of substantially any shape. First layer 302 may comprise, for example, an aluminum layer, a glass composite layer, or a carbon composite layer. To facilitate subsequent removal of a stiffening element from mold tool 300, a parting film or similar may be used between mold tool 300 and first layer 302. First layer 302 may comprise two or more sublayers (not shown).

Figure 3B:
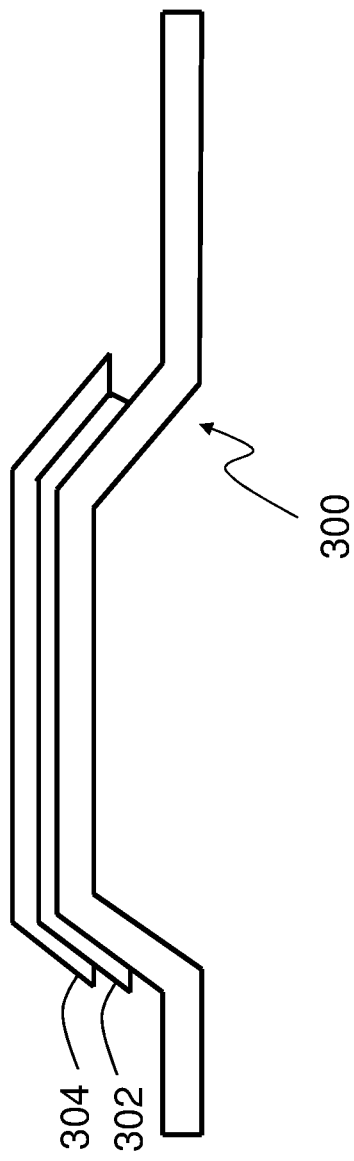
FIG. 3B shows laying up a second layer on the first layer of FIG. 3A, according to some examples of the disclosed stiffening elements.

FIG. 3B shows laying up a second layer on the first layer of FIG. 3A, according to some examples of the disclosed stiffening elements. As shown in FIG. 3B, second layer 304 may be laid up on first layer 302 to form a first portion of stack 318 (see FIG. 3D). Second layer 304 may comprise, for example, an aluminum layer, a glass composite layer, or a carbon composite layer, provided that an aluminum layer does not directly contact a carbon composite layer (due to galvanic corrosion concerns). Second layer 304 may comprise two or more sublayers (not shown). The shape of second layer 304 may be the same as or differ from the shape of first layer 302. The thickness of second layer 304 may be the same as or differ from the thickness of first layer 302.

Stack 318 may include an additional layer (not shown) between first layer 302 and second layer 304. The additional layer may improve the bonding of first layer 302 and second layer 304. The additional layer may be, for example, an adhesive layer. In such cases, second layer 304 may be adjacent to first layer 302, but may not directly contact first layer 302. Care should be taken during selection of material(s) for such an additional layer because, for example, some material(s) comprise elements or compounds that may interact with first layer 302 and/or second layer 304 via one or more interaction mechanisms.

Figure 3C:
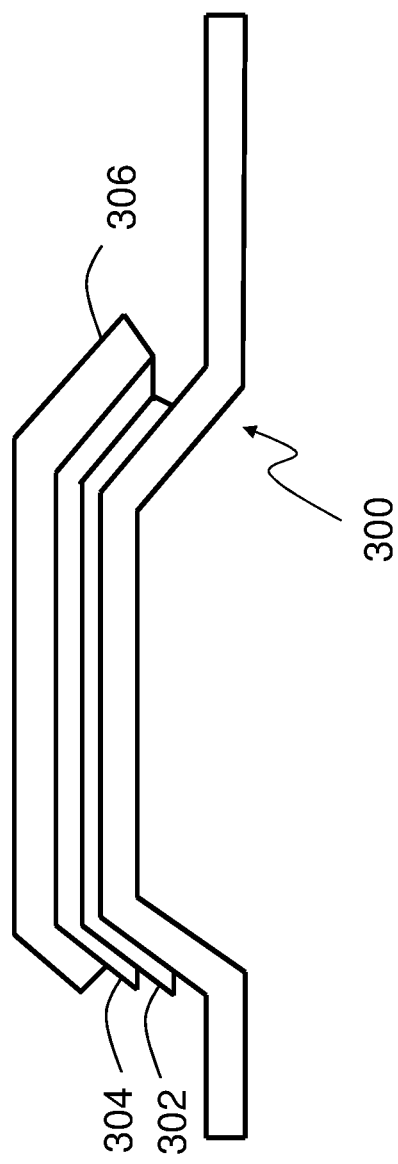
FIG. 3C shows laying up a third layer on the second layer of FIG. 3B, according to some examples of the disclosed stiffening elements.

FIG. 3C shows laying up a third layer on the second layer of FIG. 3B, according to some examples of the disclosed stiffening elements. As shown in FIG. 3C, third layer 306 may be laid up on second layer 304 to form a second portion of stack 318. Third layer 306 may comprise, for example, an aluminum layer, a glass composite layer, or a carbon composite layer, as long as an aluminum layer does not directly contact a carbon composite layer (due to galvanic corrosion concerns). Third layer 306 may comprise two or more sublayers (not shown). The shape of third layer 306 may be the same as or differ from the shape of first layer 302. The thickness of third layer 306 may be the same as or differ from the thickness of first layer 302. The shape of third layer 306 may be the same as or differ from the shape of second layer 304. The thickness of third layer 306 may be the same as or differ from the thickness of second layer 304.

Stack 318 may include an additional layer (not shown) between second layer 304 and third layer 306. The additional layer may improve the bonding of second layer 304 and third layer 306. The additional layer may be, for example, an adhesive layer. In such cases, third layer 306 may be adjacent to second layer 304, but may not directly contact second layer 304. Care should be taken during selection of material(s) for such an additional layer because, for example, some material(s) comprise elements or compounds that may interact with second layer 304 and/or third layer 306 via one or more interaction mechanisms.

In addition to addressing galvanic corrosion concerns, a glass composite layer also may function as a compliant layer, reducing strain within and/or stress between layers adjacent to the glass composite layer (e.g., an aluminum layer on one side and a carbon fiber layer on the other). Such a compliant layer may at least partially decouple effects (e.g., thermal contraction, thermal expansion, strains, or stresses) associated with the layers adjacent to the glass composite layer, and/or reduce strain within and/or stress between layers through effects associated with orientation of glass fibers in the glass composite layer(s).

The addition of layers may continue until a desired stacking of layers is achieved. The laying up may be done manually and/or automatically.

Surfaces of aluminum layers may undergo surface preparation, such as alkaline degreasing, chromic acid anodizing or other anodizing processing, priming (e.g., with BR 127 corrosion-inhibiting primer), sol-gel, and/or pickling in chromic-sulfuric acid. The surfaces also may be roughened, for example, by abrasion.

Stack 318 may be bagged (e.g., vacuum bag) on the mold tool (e.g., a mandrel).

The stacking and consolidating may use stationary compression molding (e.g., autoclave) or continuous compression molding ("CCM") (e.g., out-of-autoclave or vacuum-bag-only). These techniques may allow stiffening elements to be formed in a single manufacturing operation, such as a single-step CCM thermoplastic consolidation process.

Figure 3D:
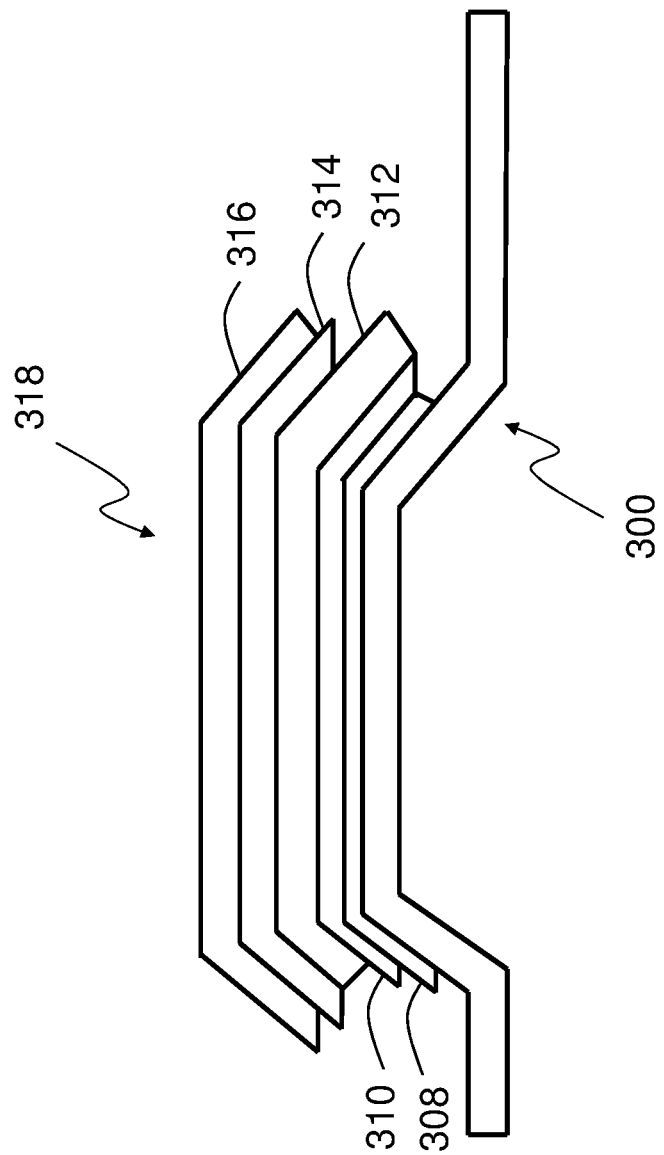
FIG. 3D shows a stack comprising a first carbon composite layer, a first glass composite layer, a second carbon composite layer, a second glass composite layer, and/or an aluminum layer, according to some examples of the disclosed stiffening elements.

FIG. 3D shows stack 318 comprising a first carbon composite layer, a first glass composite layer, a second carbon composite layer, a second glass composite layer, and/or an aluminum layer, according to some examples of the disclosed stiffening elements. As shown in FIG. 3D, first carbon composite layer 308 may be laid up on mold tool 300, first glass composite layer 310 may be laid up on first carbon composite layer 308, second carbon composite layer 312 may be laid up on first glass composite layer 310, second glass composite layer 314 may be laid up on second carbon composite layer 312, and/or aluminum layer 316 may be laid up on second glass composite layer 314 to achieve stack 318.

First glass composite layer 310 may be adjacent to first carbon composite layer 308, second carbon composite layer 312 may be adjacent to first glass composite layer 310, second glass composite layer 314 may be adjacent to second carbon composite layer 312, and/or aluminum layer 316 may be adjacent to second glass composite layer 314.

One or more of first carbon composite layer 308, first glass composite layer 310, second carbon composite layer 312, second glass composite layer 314, or aluminum layer 316 may comprise two or more sublayers (not shown).

Stack 318 may include additional layer(s) (not shown) between first carbon composite layer 308 and first glass composite layer 310; between first glass composite layer 310 and second carbon composite layer 312; between second carbon composite layer 312 and second glass composite layer 314; and/or between second glass composite layer 314 and aluminum layer 316. The additional layer(s) may improve the bonding of associated adjacent layers. The additional layer(s) may be, for example, adhesive layer(s). In such cases, layers may be adjacent to each other, but may not directly contact each other. Care should be taken during selection of material(s) for such additional layer(s) because, for example, some material(s) comprise elements or compounds that may interact with other layers via one or more interaction mechanisms.

One or both of first glass composite layer 310 or second glass composite layer 314 may comprise one or more thermoplastic prepreg plies. The one or more thermoplastic prepreg plies may be consolidated at a temperature sufficient to soften aluminum layer 316. The consolidating of the one or more thermoplastic prepreg plies may be conducted, for example, in an autoclave.

The consolidating of the one or more thermoplastic prepreg plies of one or both of first glass composite layer 310 or second glass composite layer 314 comprises raising a temperature of the one or more thermoplastic prepreg plies to $\geq 600°$ F., $\geq 650°$ F., $\geq 675°$ F., or $\geq 700°$ F. (e.g., 707° F.±9° F. or 710° F.±10° F.); raising a pressure of the one or more thermoplastic prepreg plies to $\geq 50$ psig, $\geq 100$ psig, $\geq 150$ psig, $\geq 200$ psig, $\geq 250$ psig, or $\leq 300$ psig (e.g., 100 psig±5 psig or 290 psig minimum); and/or holding the temperature and pressure for 5 minutes, 10 minutes, $\geq 15$ minutes, or $\geq 20$ minutes (e.g., 20 minutes+15 minutes/−5 minutes). For example, the temperature of the one or more thermoplastic prepreg plies may be raised to 710° F.±10° F., the pressure adjusted to 100 psig±5 psig, and then the temperature and pressure may be held within those ranges for 20 minutes+15 minutes/−5 minutes. For example, the temperature of the one or more thermoplastic prepreg plies may be raised to 707° F.±9° F., the pressure adjusted to 290 psig minimum, and then the temperature and pressure may be held within those temperature and pressure ranges for 6 minutes minimum.

The consolidating of the one or more thermoplastic prepreg plies of one or both of first glass composite layer 310 or second glass composite layer 314 comprises raising a temperature of stack 318 to ≥600° F., ≥650° F., ≥675° F., or ≥700° F. (e.g., 707° F.±9° F. or 710° F.±10° F.); raising a pressure of stack 318 to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of stack 318 may be raised to 710° F.±10° F., the pressure adjusted to 100 psig±5 psig, and then the temperature and pressure may be held within those temperature and pressure ranges for 20 minutes+15 minutes/−5 minutes. For example, the temperature of stack 318 may be raised to 707° F.±9° F., the pressure adjusted to 290 psig minimum, and then the temperature and pressure may be held within those temperature and pressure ranges for 6 minutes minimum.

One or both of first carbon composite layer 308 or second carbon composite layer 312 may comprise one or more thermoplastic prepreg plies. The one or more thermoplastic prepreg plies may be consolidated at a temperature sufficient to soften aluminum layer 316. The consolidating of the one or more thermoplastic prepreg plies may be conducted, for example, in an autoclave.

The consolidating of the one or more thermoplastic prepreg plies of one or both of first carbon composite layer 308 or second carbon composite layer 312 comprises raising a temperature of the one or more thermoplastic prepreg plies to ≥600° F., ≥650° F., ≥675° F., or ≥700° F. (e.g., 707° F.±9° F. or 710° F.±10° F.); raising a pressure of the one or more thermoplastic prepreg plies to ≥50 pounds per square inch gage ("psig"), ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the one or more thermoplastic prepreg plies may be raised to 710° F.±10° F., the pressure adjusted to 100 psig±5 psig, and then the temperature and pressure may be held within those ranges for 20 minutes+15 minutes/−5 minutes. For example, the temperature of the one or more thermoplastic prepreg plies may be raised to 707° F.±9° F., the pressure adjusted to 290 psig minimum, and then the temperature and pressure may be held within those temperature and pressure ranges for 6 minutes minimum.

The consolidating of the one or more thermoplastic prepreg plies of one or both of first carbon composite layer 308 or second carbon composite layer 312 comprises raising a temperature of stack 318 to ≥600° F., ≥650° F., ≥675° F., or ≥700° F. (e.g., 707° F.±9° F. or 710° F.±10° F.); raising a pressure of stack 318 to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of stack 318 may be raised to 710° F.±10° F., the pressure adjusted to 100 psig±5 psig, and then the temperature and pressure may be held within those temperature and pressure ranges for 20 minutes+15 minutes/−5 minutes. For example, the temperature of stack 318 may be raised to 707° F.±9° F., the pressure adjusted to 290 psig minimum, and then the temperature and pressure may be held within those temperature and pressure ranges for 6 minutes minimum.

Such thermoplastic prepreg plies may be produced in advance and stored, for example, on rolls with backing paper. Prepreg tapes for thermoplastic prepreg plies, if unidirectional, may be produced, for example, by extrusion or pultrusion.

The thermoplastic prepreg plies may be dried (e.g., in an oven) prior to consolidation. For example, the thermoplastic prepreg plies may be dried at 250° F. for a minimum of 10 hours prior to consolidation.

One or both of first glass composite layer 310 or second glass composite layer 314 may comprise first thermoplastic resin. The temperature and pressure of stack 318 may be adjusted so as to consolidate stack 318 when forming a stiffening element. The adjusting of the temperature and pressure of stack 318 comprises raising a temperature of the first thermoplastic resin to ≥600° F., ≥650° F., ≥675° F., or ≥700° F. (e.g., 707° F.±9° F. or 710° F.±10° F.); raising a pressure of the first thermoplastic resin to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the first thermoplastic resin may be raised to 710° F.±10° F., the pressure adjusted to 100 psig±5 psig, and then the temperature and pressure may be held within those ranges for 20 minutes+15 minutes/−5 minutes. For example, the temperature of the first thermoplastic resin may be raised to 707° F.±9° F., the pressure adjusted to 290 psig minimum, and then the temperature and pressure may be held within those temperature and pressure ranges for 6 minutes minimum.

One or both of first carbon composite layer 308 or second carbon composite layer 312 may comprise second thermoplastic resin. The temperature and pressure of the second thermoplastic resin may be adjusted so as to consolidate stack 318 when forming a stiffening element. The adjusting of the temperature and pressure of stack 318 comprises raising a temperature of the second thermoplastic resin to ≥600° F., ≥650° F., ≥675° F., or ≥700° F. (e.g., 707° F.±9° F. or 710° F.±10° F.); raising a pressure of the second thermoplastic resin to ≥50 psig, ≥100 psig, ≥150 psig, ≥200 psig, ≥250 psig, or ≤300 psig (e.g., 100 psig±5 psig or 290 psig minimum); and/or holding the temperature and pressure for ≥5 minutes, ≥10 minutes, ≥15 minutes, or ≥20 minutes (e.g., 20 minutes+15 minutes/−5 minutes). For example, the temperature of the second thermoplastic resin may be raised to 710° F.±10° F., the pressure adjusted to 100 psig±5 psig, and then the temperature and pressure may be held within those ranges for 20 minutes+15 minutes/−5 minutes. For example, the temperature of the second thermoplastic resin may be raised to 707° F.±9° F., the pressure adjusted to 290 psig minimum, and then the temperature and pressure may be held within those temperature and pressure ranges for 6 minutes minimum.

A temperature versus time profile for consolidating the one or more thermoplastic prepreg plies at a temperature sufficient to soften aluminum layer 316, or for adjusting the temperature and pressure of stack 318 so as to consolidate stack 318 may comprise three phases: a heat-up phase (generally positive slope), a hold phase (generally zero slope), and a cooldown phase (generally negative slope). In the heat-up phase, the heat-up rate may take on almost any value (e.g., in ° F./minute). In the hold phase, the temperature and pressure may be held substantially constant within prescribed bands or above prescribed minimums. In the cooldown phase, the cooldown rate (e.g., in ° F./minute) may be limited, for example, by concerns regarding thermally induced stress, crystallinity issues, and/or equipment limitations. In addition or in the alternative, the pressure band may need to be maintained until the temperature is significantly reduced.

FIG. 4A shows a temperature versus time profile for consolidating one or more thermoplastic prepreg plies at a temperature sufficient to soften an aluminum layer, or for adjusting the temperature and pressure of a stack so as to consolidate the stack when forming a stiffening element, according to some examples of the disclosed stiffening elements. As shown in FIG. 4A, in the heat-up phase, the heat-up rate may take on almost any value; in the hold phase, the consolidation temperature (e.g., $T_{Consolidation}$) may be held substantially constant within a prescribed band (e.g., 707° F.±9° F. or 710° F.±10° F.); and in the cooldown phase, the cooldown rate may be limited (e.g., ≤100° F./minute) until the temperature is significantly reduced (e.g., until the temperature is ≤250° F.).

FIG. 4B shows a pressure versus time profile for consolidating one or more thermoplastic prepreg plies at a temperature sufficient to soften an aluminum layer, or for adjusting the temperature and pressure of a stack so as to consolidate the stack when forming a stiffening element, according to some examples of the disclosed stiffening elements. As shown in FIG. 4B, in the heat-up phase, the pressure is low; in the hold phase, the consolidation pressure (e.g., $P_{Consolidation}$) may be held substantially constant within a prescribed band (e.g., 100 psig±5 psig for 20 minutes+15 minutes/−5 minutes or 290 psig minimum for 6 minutes minimum); and in the cooldown phase, the pressure band may need to be maintained until the temperature is significantly reduced (e.g., 100 psig±5 psig or 290 psig minimum until the temperature is ≤250° F.).

As shown in FIG. 4B, the pressure increase to the adjusted pressure and/or the pressure decrease from the adjusted pressure may be relatively rapid. The pressure increase to the adjusted pressure and/or the pressure decrease from the adjusted pressure may be relatively slow, so that the leading and/or trailing edges of the pressure graph have a more gradual slope. The pressure increase to the adjusted pressure and/or the pressure decrease from the adjusted pressure may be conducted in a series of smaller steps.

FIG. 4C shows a temperature and pressure versus time profile for consolidating one or more thermoplastic prepreg plies at a temperature sufficient to soften an aluminum layer, or for adjusting the temperature and pressure of a stack, according to some examples of the disclosed stiffening elements. As shown in FIG. 4C, in the heat-up phase, the heat-up rate may take on almost any value; in the hold phase, the consolidation temperature (e.g., $T_{Consolidation}$) and the consolidation pressure (e.g., $P_{Consolidation}$) may be held substantially constant within prescribed bands or above prescribed minimums (e.g., 707° F.±9° F. and 290 psig minimum for 6 minutes minimum); and in the cooldown phase, the cooldown rate may be limited (e.g., ≤108° F./minute) until the temperature is significantly reduced (e.g., until the temperature is ≤410° F.) and/or the pressure minimum may need to be maintained until the temperature is significantly reduced (e.g., 290 psig minimum until the temperature is ≤248° F.).

During the heat-up phase, the heat-up may be paused to allow temperatures to stabilize and/or standardize, and then the heat-up may continue (e.g., effectively creating a soaking or pre-consolidation step or steps in the heat-up profile at a dwell temperature, not shown). Similarly, during the cooldown phase, the cooldown may be paused to allow temperatures to stabilize and/or standardize, and then the cooldown may continue (e.g., effectively creating a soaking or post-consolidation step or steps in the cooldown profile, not shown).

Stiffening elements with a variety of component cross-sectional shapes may be produced. The stiffening elements may have, for example, cross-sections that are round and solid (e.g., a rod), round and hollow (e.g., a tube), rectangular and solid, or rectangular and hollow. The stiffening elements may have, for example, cross-sections that resemble blades, hats, the Greek capital letter Ω, and/or the English capital letters C, I, L, T, U, or Z.

Example 1

A 4-layer stack may comprise: an aluminum layer (layer 1), two glass composite layers (sublayers 2-3 and 12-13), and a carbon composite layer (sublayers 4-11). The carbon composite layer may exhibit quasi-isotropic strength properties. Per the table below, each glass composite layer comprises two sublayers, and the carbon composite layer comprises eight sublayers.

| Layer Number | Layer Composition | Layer Thickness (inches) |
|---|---|---|
| 1 | Aluminum | 0.0100 |
| 2 | Glass Composite | 0.0035 |
| 3 | Glass Composite | 0.0035 |
| 4 | Carbon Composite | 0.0055 |
| 5 | Carbon Composite | 0.0055 |
| 6 | Carbon Composite | 0.0055 |
| 7 | Carbon Composite | 0.0055 |
| 8 | Carbon Composite | 0.0055 |
| 9 | Carbon Composite | 0.0055 |
| 10 | Carbon Composite | 0.0055 |
| 11 | Carbon Composite | 0.0055 |
| 12 | Glass Composite | 0.0035 |
| 13 | Glass Composite | 0.0035 |
| Total | N/A | 0.0680 |

Example 2

A 4-layer stack may comprise: an aluminum layer (layer 1), two glass composite layers (sublayers 2-3 and 20-21), and a carbon composite layer (sublayers 4-19). The carbon composite layer may exhibit quasi-isotropic strength properties. Per the table below, each glass composite layer comprises two sublayers, and the carbon composite layer comprises sixteen sublayers.

| Layer Number | Layer Composition | Layer Thickness (inches) |
|---|---|---|
| 1 | Aluminum | 0.0100 |
| 2 | Glass Composite | 0.0025 |
| 3 | Glass Composite | 0.0025 |
| 4 | Carbon Composite | 0.0054 |
| 5 | Carbon Composite | 0.0054 |
| 6 | Carbon Composite | 0.0054 |
| 7 | Carbon Composite | 0.0054 |

| Layer Number | Layer Composition | Layer Thickness (inches) |
|---|---|---|
| 8 | Carbon Composite | 0.0054 |
| 9 | Carbon Composite | 0.0054 |
| 10 | Carbon Composite | 0.0054 |
| 11 | Carbon Composite | 0.0054 |
| 12 | Carbon Composite | 0.0054 |
| 13 | Carbon Composite | 0.0054 |
| 14 | Carbon Composite | 0.0054 |
| 15 | Carbon Composite | 0.0054 |
| 16 | Carbon Composite | 0.0054 |
| 17 | Carbon Composite | 0.0054 |
| 18 | Carbon Composite | 0.0054 |
| 19 | Carbon Composite | 0.0054 |
| 20 | Glass Composite | 0.0025 |
| 21 | Glass Composite | 0.0025 |
| Total | N/A | 0.1064 |

Example 3

A 4-layer stack may comprise: an aluminum layer (layer 1), two glass composite layers (sublayers 2-3 and 12-13), and a carbon composite layer (sublayers 4-11). The carbon composite layer may exhibit quasi-isotropic strength properties. Per the table below, each glass composite layer comprises two sublayers, and the carbon composite layer comprises eight sublayers.

| Layer Number | Layer Composition | Layer Thickness (inches) |
|---|---|---|
| 1 | Aluminum | 0.0100 |
| 2 | Glass Composite | 0.0035 |
| 3 | Glass Composite | 0.0035 |
| 4 | Carbon Composite | 0.0075 |
| 5 | Carbon Composite | 0.0075 |
| 6 | Carbon Composite | 0.0075 |
| 7 | Carbon Composite | 0.0075 |
| 8 | Carbon Composite | 0.0075 |
| 9 | Carbon Composite | 0.0075 |
| 10 | Carbon Composite | 0.0075 |
| 11 | Carbon Composite | 0.0075 |
| 12 | Glass Composite | 0.0035 |
| 13 | Glass Composite | 0.0035 |
| Total | N/A | 0.0840 |

Example 4

A 4-layer stack may comprise: an aluminum layer (layer 1), two glass composite layers (layers 2 and 11), and a carbon composite layer (sublayers 3-10). The carbon composite layer may exhibit quasi-isotropic strength properties. Per the table below, each glass composite layer comprises one layer, and the carbon composite layer comprises eight sublayers.

| Layer Number | Layer Composition | Layer Thickness (inches) |
|---|---|---|
| 1 | Aluminum | 0.0100 |
| 2 | Glass Composite | 0.0035 |
| 3 | Carbon Composite | 0.0075 |
| 4 | Carbon Composite | 0.0075 |
| 5 | Carbon Composite | 0.0075 |
| 6 | Carbon Composite | 0.0075 |
| 7 | Carbon Composite | 0.0075 |
| 8 | Carbon Composite | 0.0075 |
| 9 | Carbon Composite | 0.0075 |
| 10 | Carbon Composite | 0.0075 |
| 11 | Glass Composite | 0.0035 |
| Total | N/A | 0.0770 |

E-glass, S-glass, and/or S-2 glass fibers (e.g., 933 S-2 glass fibers), for example, for glass composite layers may be commercially available, for example, from AGY of Aiken, S.C., under the trade name S-2 Glass®.

Carbon fibers (e.g., AS4D 4000 carbon fibers, IM7 (HS-CP-5000) carbon fibers), for example, for carbon composite layers may be commercially available, for example, from Hexcel Corporation of Stamford, Conn., under the trade name HexTow®.

FIG. 5 shows stiffening element 500, according to some examples of the disclosed stiffening elements. Stiffening element 500 may be lightweight, strong, and comprise one or more integral current flowpaths. Thus, stiffening element 500 may be used as a lightweight strength member, while also being incorporated into a CRN, among other uses.

Stiffening element 500 may have a cross-section that resembles the English capital letter "I". As shown in FIG. 5, a cross-section of stiffening element 500 may include, for example, a vertical segment 550 of the cross-section joining an upper horizontal segment 560 of the cross-section and a lower horizontal segment 570 of the cross-section. Stiffening element 500 may have, for example, another shape, such as a cross-section that resembles a blade, a hat, the Greek capital letter Ω, or the English capital letter C, L, T, U, or Z.

As shown in FIG. 5, in upper horizontal segment 560, the upper-left branch of stiffening element 500 comprises (from top down): first aluminum layer 502; first glass composite layer 504 adjacent to first aluminum layer 502; first carbon composite layer 506, including first carbon composite sublayer 506-3A, adjacent to first glass composite layer 504, and opposite to first aluminum layer 502; second glass composite layer 508A adjacent to first carbon composite layer 506, and opposite to first glass composite layer 504; and second aluminum layer 510A adjacent to second glass composite layer 508A, and opposite to first carbon composite layer 506. First carbon composite sublayer 506-3A may include, for example, upper portion 506-3A1 in upper horizontal segment 560, vertical portion 506-3A2 in vertical segment 550, and lower portion 506-3A3 in lower horizontal segment 570. Second glass composite layer 508A may include, for example, upper portion 508A1 in upper horizontal segment 560, vertical portion 508A2 in vertical segment 550, and lower portion 508A3 in lower horizontal segment 570. Second aluminum layer 510A may include, for example, upper portion 510A1 in upper horizontal segment 560, vertical portion 510A2 in vertical segment 550, and lower portion 510A3 in lower horizontal segment 570. Any of these layers may have the same thickness as or a different thickness from any other of these layers.

As also shown in FIG. 5, in upper horizontal segment 560, the upper-right branch of stiffening element 500 comprises (from top down): first aluminum layer 502; first glass composite layer 504 adjacent to first aluminum layer 502; first carbon composite layer 506, including first carbon composite sublayer 506-3B, adjacent to first glass composite layer 504, and opposite to first aluminum layer 502; fourth glass composite layer 508B adjacent to first carbon composite layer 506, and opposite to first glass composite layer 504; and fourth aluminum layer 510B adjacent to fourth glass composite layer 508B, and opposite to first carbon composite layer 506. First carbon composite sublayer 506-3B may include, for example, upper portion 506-3B1 in upper horizontal segment 560, vertical portion 506-3B2 in vertical segment 550, and lower portion 506-3B3 in lower horizontal segment 570. Fourth glass composite layer 508B may include, for example, upper portion 508B1 in upper horizontal segment 560, vertical portion 508B2 in vertical segment 550, and lower portion 508B3 in lower horizontal segment 570. Fourth aluminum layer 510B may include, for example, upper portion 510B1 in upper horizontal segment 560, vertical portion 510B2 in vertical segment 550, and lower portion 510B3 in lower horizontal segment 570. Any of these layers may have the same thickness as or a different thickness from any other of these layers.

As also shown in FIG. 5, in lower horizontal segment 570, the lower-left branch of stiffening element 500 comprises (from bottom up): third aluminum layer 512; third glass composite layer 514 adjacent to third aluminum layer 512; second carbon composite layer 516 adjacent to third glass composite layer 514, and opposite to third aluminum layer 512; lower portion 506-3A3 of first carbon composite sublayer 506-3A adjacent to second carbon composite layer 516, and opposite to third glass composite layer 514; lower portion 508A3 of second glass composite layer 508A adjacent to lower portion 506-3A3 of first carbon composite sublayer 506-3A, and opposite to second carbon composite layer 516; and lower portion 510A3 of second aluminum layer 510A adjacent to lower portion 508A3 of second glass composite layer 508A, and opposite to lower portion 506-3A3 of first carbon composite sublayer 506-3A. As discussed above, first carbon composite sublayer 506-3A may include, for example, upper portion 506-3A1 in upper horizontal segment 560, vertical portion 506-3A2 in vertical segment 550, and lower portion 506-3A3 in lower horizontal segment 570. As also discussed above, second glass composite layer 508A may include, for example, upper portion 508A1 in upper horizontal segment 560, vertical portion 508A2 in vertical segment 550, and lower portion 508A3 in lower horizontal segment 570. Additionally, as discussed above, second aluminum layer 510A may include, for example, upper portion 510A1 in upper horizontal segment 560, vertical portion 510A2 in vertical segment 550, and lower portion 510A3 in lower horizontal segment 570. Any of these layers may have the same thickness as or a different thickness from any other of these layers.

As also shown in FIG. 5, in lower horizontal segment 570, the lower-right branch of stiffening element 500 comprises (from bottom up): third aluminum layer 512; third glass composite layer 514 adjacent to third aluminum layer 512; second carbon composite layer 516 adjacent to third glass composite layer 514, and opposite to third aluminum layer 512; lower portion 506-3B3 of first carbon composite sublayer 506-3B adjacent to second carbon composite layer 516, and opposite to third glass composite layer 514; lower portion 508B3 of fourth glass composite layer 508B adjacent to lower portion 506-3B3 of first carbon composite sublayer 506-3B, and opposite to second carbon composite layer 516; and lower portion 510B3 of fourth aluminum layer 510B adjacent to lower portion 508B3 of fourth glass composite layer 508B, and opposite to lower portion 506-3B3 of first carbon composite sublayer 506-3B. As discussed above, first carbon composite sublayer 506-3B may include, for example, upper portion 506-3B1 in upper horizontal segment 560, vertical portion 506-3B2 in vertical segment 550, and lower portion 506-3B3 in lower horizontal segment 570. As also discussed above, fourth glass composite layer 508B may include, for example, upper portion 508B1 in upper horizontal segment 560, vertical portion 508B2 in vertical segment 550, and lower portion 508B3 in lower horizontal segment 570. Additionally, as discussed above, fourth aluminum layer 5108 may include, for example, upper portion 510B1 in upper horizontal segment 560, vertical portion 510B2 in vertical segment 550, and lower portion 510B3 in lower horizontal segment 570. Any of these layers may have the same thickness as or a different thickness from any other of these layers.

As also shown in FIG. 5, the central branch of stiffening element 500 comprises (from left to right): vertical portion 510A2 of second aluminum layer 510A; vertical portion 508A2 of second glass composite layer 508A adjacent to vertical portion 510A2 of second aluminum layer 510A; vertical portion 506-3A2 of first carbon composite sublayer 506-3A adjacent to vertical portion 508A2 of second glass composite layer 508A, and opposite to vertical portion 510A2 of second aluminum layer 510A; third carbon composite sublayer 518-1 (part of third carbon composite layer 518) adjacent to vertical portion 506-3A2 of first carbon composite sublayer 506-3A, and opposite to vertical portion 508A2 of second glass composite layer 508A; third carbon composite sublayer 518-2 (part of third carbon composite layer 518) adjacent to third carbon composite sublayer 518-1, and opposite to vertical portion 506-3A2 of first carbon composite sublayer 506-3A; vertical portion 506-3B2 of first carbon composite sublayer 506-3B adjacent to third carbon composite sublayer 518-2, and opposite to third carbon composite sublayer 518-1; vertical portion 508B2 of fourth glass composite layer 508B adjacent to vertical portion 506-3B2 of first carbon composite sublayer 506-3B, and opposite to third carbon composite sublayer 518-2; and vertical portion 510B2 of fourth aluminum layer 510B adjacent to vertical portion 508B2 of fourth glass composite layer 508B, and opposite to vertical portion 506-3B2 of first carbon composite sublayer 506-3B. Third carbon composite layer 518 is in vertical segment 550. Second carbon composite layer 516 is in lower horizontal segment 570. Third carbon composite layer 518 contacts second carbon composite layer 516 and the upper portion of first carbon composite layer 506. Any of these layers may have the same thickness as or a different thickness from any other of these layers.

First glass composite layer 504 may comprise one or more glass-fiber-reinforced thermoplastic prepreg plies. First carbon composite layer 506 may comprise one or more carbon-fiber-reinforced thermoplastic prepreg plies. Second/fourth glass composite layer 508A/B may comprise one or more glass-fiber-reinforced thermoplastic prepreg plies. Third glass composite layer 514 may comprise one or more glass-fiber-reinforced thermoplastic prepreg plies. Second carbon composite layer 516 may comprise one or more carbon-fiber-reinforced thermoplastic prepreg plies. Third carbon composite layer 518 may comprise one or more carbon-fiber-reinforced thermoplastic prepreg plies.

First aluminum layer 502 may comprise a plurality of first aluminum sublayers 502-1, 502-2 (e.g., 502-1, 502-2, . . . , 502-$n$). The number ($n$) of first aluminum sublayers may be, for example, 2, 3, 4, 5, 6, or more sublayers.

First glass composite layer 504 may comprise a plurality of first glass composite sublayers (e.g., 504-1, 504-2, . . . , 504-*o*). The number (o) of first glass composite sublayers may be, for example, 2, 3, 4, 5, 6, 7, 8, 9, 10, 11, 12, or more sublayers.

First carbon composite layer 506 may comprise a plurality of first carbon composite sublayers 506-1, 506-2, 506-3A/B (e.g., 506-1, 506-2, . . . , 506-*p*). The number (p) of first carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Second/fourth glass composite layer 508A/B may comprise a plurality of second/fourth glass composite sublayers (e.g., 508A/B-1, 508A/B-2, . . . , 508A/B-q). The number (q) of second glass composite sublayers may be, for example, 2, 3, 4, 5, 6, 7, 8, 9, 10, 11, 12, or more sublayers.

Second/fourth aluminum layer 510A/B may comprise a plurality of second/fourth aluminum sublayers (e.g., 510A/B-1, 510A/B-2, . . . , 510A/B-r). The number (r) of second aluminum sublayers may be, for example, 2, 3, 4, 5, 6, or more sublayers.

Third aluminum layer 512 may comprise a plurality of third aluminum sublayers 512-1, 512-2 (e.g., 512-1, 512-2, . . . , 512-*s*). The number (s) of third aluminum sublayers may be, for example, 2, 3, 4, 5, 6, or more sublayers.

Third glass composite layer 514 may comprise a plurality of third glass composite sublayers (e.g., 514-1, 514-2, . . . , 514-*t*). The number (t) of third glass composite sublayers may be, for example, 2, 3, 4, 5, 6, 7, 8, 9, 10, 11, 12, or more sublayers.

Second carbon composite layer 516 may comprise a plurality of second carbon composite sublayers 516-1, 516-2 (e.g., 516-1, 516-2, . . . , 516-*u*). The number (u) of second carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

Third carbon composite layer 518 may comprise a plurality of third carbon composite sublayers 518-1, 518-2 (e.g., 518-1, 518-2, . . . , 518-*v*). The number (v) of third carbon composite sublayers may be, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or more sublayers (e.g., 8, 16, 24, 32, 40, or 64 sublayers).

First aluminum layer 502 may be configured to form the outer surface of stiffening element 500 or an outer surface of stiffening element 500. Second/fourth aluminum layer 510A/B (second aluminum layer 510A, fourth aluminum layer 510B, or both) may be configured to form the outer surface of stiffening element 500 or an outer surface of stiffening element 500. Third aluminum layer 512 may be configured to form the outer surface of stiffening element 500 or an outer surface of stiffening element 500.

Any of first aluminum layer 502, second/fourth aluminum layer 510A/B (second aluminum layer 510A, fourth aluminum layer 510B, or both), or third aluminum layer 512 may be configured to form a first outer surface of stiffening element 500, while any other of first aluminum layer 502, second/fourth aluminum layer 510A/B (second aluminum layer 510A, fourth aluminum layer 510B, or both), or third aluminum layer 512 may be configured to form a second outer surface of stiffening element 500. For example, first aluminum layer 502 may be configured to form a first outer surface 0f stiffening element 500, while third aluminum layer 512 may be configured to form a second outer surface of stiffening element 500. In another example, second aluminum layer 510A may be configured to form a first outer surface of stiffening element 500, while fourth aluminum layer 510B may be configured to form a second outer surface of stiffening element 500.

Stiffening element 500 may comprise one or more integral current flowpaths. First aluminum layer 502 may be configured to form at least part of the one or more integral current flowpaths. Second/fourth aluminum layer 510A/B (second aluminum layer 510A, fourth aluminum layer 510B, or both) may be configured to form at least part of the one or more integral current flowpaths. Third aluminum layer 512 may be configured to form at least part of the one or more integral current flowpaths.

Any of first aluminum layer 502, second/fourth aluminum layer 510A/B (second aluminum layer 510A, fourth aluminum layer 510B, or both), or third aluminum layer 512 may be configured to form a first flowpath of the one or more integral current flowpaths, while any other of first aluminum layer 502, second/fourth aluminum layer 510A/B (second aluminum layer 510A, fourth aluminum layer 510B, or both), or third aluminum layer 512 may be configured to form a second flowpath of the one or more integral current flowpaths. The first flowpath may differ from the second flowpath (e.g., independent from each other). The first and second flowpaths may be part of a same integral current flowpath.

Various combinations of first aluminum layer 502, second/fourth aluminum layer 510A/B (second aluminum layer 510A, fourth aluminum layer 510B, or both), or third aluminum layer 512 may be configured to form one or multiple (two, three, or four) flowpaths of the one or more integral current flowpaths. The multiple flowpaths may differ from each other (e.g., independent from each other). Two or more of the multiple flowpaths may be part of a same integral current flowpath.

Current flow in any one of the multiple flowpaths may be substantially parallel to current flow in any other of the multiple flowpaths. Current flow in any one of the multiple flowpaths may be substantially in a same direction as current flow in any other of the multiple flowpaths. Current flow in any one of the multiple flowpaths may be substantially in an opposite direction from current flow in any other of the multiple flowpaths. Current flow in any one of the multiple flowpaths may be substantially parallel to and in a same direction as current flow in any other of the multiple flowpaths. Current flow in any one of the multiple flowpaths may be substantially parallel to but in an opposite direction from current flow in any other of the multiple flowpaths.

Each of first aluminum layer 502, second/fourth aluminum layer 510A/B (second aluminum layer 510A, fourth aluminum layer 510B, or both), or third aluminum layer 512 may comprise the same aluminum alloy as any other of first aluminum layer 502, second/fourth aluminum layer 510A/B (second aluminum layer 510A, fourth aluminum layer 510B, or both), or third aluminum layer 512. Each of first aluminum layer 502, second/fourth aluminum layer 510A/B (second aluminum layer 510A, fourth aluminum layer 510B, or both), or third aluminum layer 512 may comprise a different aluminum alloy than any other of first aluminum layer 502, second/fourth aluminum layer 510A/B (second aluminum layer 510A, fourth aluminum layer 510B, or both), or third aluminum layer 512.

Stiffening element 500 may comprise an additional layer (not shown) between the layers discussed above. When an additional layer is between two other layers, the two other layers may be adjacent to each other, but not in direct contact. The additional layer may improve the bonding of the two other layers. The additional layer may at least partially decouple effects (e.g., thermal contraction, thermal expansion, strains, or stresses) associated with the bonding of the two other layers.

The additional layer may comprise, for example, an adhesive layer. Care should be taken during selection of material(s) for such an additional layer because, for example, some adhesives comprise silver or other elements or compounds that may interact with, for example, aluminum, carbon, or glass via one or more interaction mechanisms (e.g., galvanic corrosion).

The additional layer may comprise, for example, a so-called "radius filler" to fill in gaps between the two other layers associated with, for example, a bend or corner in stiffening element 500.

Methods of using stiffening element 500, for example, as part of a current return network for a stiffened composite structure, may comprise: selecting stiffening element 500 that comprises one or more integral current flowpaths; and routing current from the current return network through the one or more integral current flowpaths of stiffening element 500.

In the methods of using stiffening element 500, the routing of the current from the current return network comprises routing the current from the current return network through first aluminum layer 502, second/fourth aluminum layer 510A/B (second aluminum layer 510A, fourth aluminum layer 510B, or both), and/or third aluminum layer 512.

In the methods of using stiffening element 500, stiffening element 500 may comprise multiple (e.g., two, three, or four) integral current flowpaths. The routing of the current from the current return network may comprise routing the current from the current return network through the two, three, or four integral current flowpaths. For example, in a three-integral-current-flowpath case, current may be routed in a first direction through second/fourth aluminum layer 510A/B, and in a second direction through both first aluminum layer 502 and third aluminum layer 512. In another example, in a four-integral-current-flowpath case, current may be routed in a first direction through second aluminum layer 510A, in a second direction through fourth aluminum layer 510B, in a third direction through first aluminum layer 502, and in a fourth direction through third aluminum layer 512.

In the methods of using stiffening element 500, current flow in one integral current flowpath may be substantially parallel to and in a same direction as current flow in any other integral current flowpath. In addition or in the alternative, current flow in one integral current flowpath may be substantially parallel to but in an opposite direction from current flow in any other integral current flowpath.

Although examples have been shown and described in this specification and figures, it would be appreciated that changes may be made to the illustrated and/or described examples without departing from their principles and spirit, the scope of which is defined by the following claims and their equivalents.

What is claimed is:

1. A stiffening element that comprises integral current flowpaths, the stiffening element comprising:
   first, second, and third carbon composite layers, each comprising one or more carbon-fiber-reinforced thermoplastic plies;
   first, second, and third glass composite layers, each comprising one or more glass-fiber-reinforced thermoplastic plies; and
   first, second, and third aluminum layers, each comprising one or more aluminum sublayers;
   wherein a cross-section of the stiffening element includes a vertical segment of the cross-section joining upper and lower horizontal segments of the cross-section,
   wherein the third carbon composite layer is in the vertical segment of the cross-section,
   wherein the second carbon composite layer is in the lower horizontal segment of the cross-section,
   wherein an upper portion of the first carbon composite layer is in the upper horizontal segment of the cross-section,
   wherein a vertical portion of the first carbon composite layer is in the vertical segment of the cross-section,
   wherein a lower portion of the first carbon composite layer is in the lower horizontal segment of the cross-section,
   wherein the third carbon composite layer contacts the second carbon composite layer and the upper portion of the first carbon composite layer,
   wherein the first glass composite layer and an upper portion of the second glass composite layer are on opposite sides of the upper portion of the first carbon composite layer,
   wherein the third glass composite layer and a lower portion of the second glass composite layer are on opposite sides of the second carbon composite layer,
   wherein the first aluminum layer contacts the first glass composite layer,
   wherein the second aluminum layer contacts the second glass composite layer,
   wherein the third aluminum layer contacts the third glass composite layer, and
   wherein the first, second, and third aluminum layers are configured to form first, second, and third independent flowpaths of the integral current flowpaths.

2. The stiffening element of claim 1, wherein the one or more carbon-fiber-reinforced thermoplastic plies comprise thermoplastic resin.

3. The stiffening element of claim 2, wherein the thermoplastic resin comprises polyetheretherketone (PEEK) or polyetherketoneketone (PEKK).

4. The stiffening element of claim 1, wherein the one or more glass-fiber-reinforced thermoplastic plies comprise thermoplastic resin.

5. The stiffening element of claim 4, wherein the thermoplastic resin comprises polyetheretherketone (PEEK) or polyetherketoneketone (PEKK).

6. The stiffening element of claim 1, wherein the one or more carbon-fiber-reinforced thermoplastic plies comprise first thermoplastic resin,
   wherein the one or more glass-fiber-reinforced thermoplastic plies comprise second thermoplastic resin, and
   wherein the first thermoplastic resin is the same as the second thermoplastic resin.

7. The stiffening element of claim 1, wherein the one or more glass-fiber-reinforced thermoplastic plies form a plurality of sublayers.

8. The stiffening element of claim 1, wherein the one or more carbon-fiber-reinforced thermoplastic plies comprise first thermoplastic resin,
   wherein the one or more glass-fiber-reinforced thermoplastic plies comprise second thermoplastic resin, and
   wherein the first thermoplastic resin differs from the second thermoplastic resin.

9. The stiffening element of claim 1, further comprising:
a fourth glass composite layer comprising one or more glass-fiber-reinforced thermoplastic plies.

10. The stiffening element of claim 9, wherein the first glass composite layer and an upper portion of the fourth glass composite layer are on opposite sides of the upper portion of the first carbon composite layer.

11. The stiffening element of claim 9, wherein the second and fourth glass composite layers are on opposite sides of the third carbon composite layer.

12. The stiffening element of claim 9, wherein the third glass composite layer and a lower portion of the fourth glass composite layer are on opposite sides of the second carbon composite layer.

13. A stiffening element that comprises integral current flowpaths, the stiffening element comprising:
first, second, and third carbon composite layers, each comprising one or more carbon-fiber-reinforced thermoplastic plies;
first, second, third, and fourth glass composite layers, each comprising one or more glass-fiber-reinforced thermoplastic plies; and
first, second, third, and fourth aluminum layers, each comprising one or more aluminum sublayers;
wherein a cross-section of the stiffening element includes a vertical segment of the cross-section joining upper and lower horizontal segments of the cross-section,
wherein the third carbon composite layer is in the vertical segment of the cross-section,
wherein the second carbon composite layer is in the lower horizontal segment of the cross-section,
wherein an upper portion of the first carbon composite layer is in the upper horizontal segment of the cross-section,
wherein a vertical portion of the first carbon composite layer is in the vertical segment of the cross-section,
wherein a lower portion of the first carbon composite layer is in the lower horizontal segment of the cross-section,
wherein the third carbon composite layer contacts the second carbon composite layer and the upper portion of the first carbon composite layer,
wherein the first glass composite layer and an upper portion of the second glass composite layer are on opposite sides of the upper portion of the first carbon composite layer,
wherein the third glass composite layer and a lower portion of the second glass composite layer are on opposite sides of the second carbon composite layer,
wherein the first aluminum layer contacts the first glass composite layer,
wherein the second aluminum layer contacts the second glass composite layer,
wherein the third aluminum layer contacts the third glass composite layer,
wherein the fourth aluminum layer contacts the fourth glass composite layer, and
wherein the first, second, third, and fourth aluminum layers are configured to form first, second, third, and fourth independent flowpaths of the integral current flowpaths.

14. The stiffening element of claim 13, wherein the one or more glass-fiber-reinforced thermoplastic plies form a plurality of sublayers.

15. The stiffening element of claim 13, wherein the one or more carbon-fiber-reinforced thermoplastic plies comprise thermoplastic resin.

16. The stiffening element of claim 15, wherein the thermoplastic resin comprises polyetheretherketone (PEEK) or polyetherketoneketone (PEKK).

17. The stiffening element of claim 13, wherein the one or more glass-fiber-reinforced thermoplastic plies comprise thermoplastic resin.

18. The stiffening element of claim 17, wherein the thermoplastic resin comprises polyetheretherketone (PEEK) or polyetherketoneketone (PEKK).

19. The stiffening element of claim 13, wherein the one or more carbon-fiber-reinforced thermoplastic plies comprise first thermoplastic resin,
wherein the one or more glass-fiber-reinforced thermoplastic plies comprise second thermoplastic resin, and
wherein the first thermoplastic resin is the same as the second thermoplastic resin.

20. The stiffening element of claim 13, wherein the one or more carbon-fiber-reinforced thermoplastic plies comprise first thermoplastic resin,
wherein the one or more glass-fiber-reinforced thermoplastic plies comprise second thermoplastic resin, and
wherein the first thermoplastic resin differs from the second thermoplastic resin.

* * * * *